(12) United States Patent
Lusted et al.

(10) Patent No.: US 9,264,270 B2
(45) Date of Patent: Feb. 16, 2016

(54) TRANSITION TIME MEASUREMENT OF PAM4 TRANSMITTERS

(71) Applicant: INTEL CORPORATION, Santa Clara, CA (US)

(72) Inventors: Kent C. Lusted, Aloha, OR (US); Adee O. Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 13/928,648

(22) Filed: Jun. 27, 2013

(65) Prior Publication Data

US 2015/0003505 A1    Jan. 1, 2015

(51) Int. Cl.
| | | |
|---|---|---|
| H03C 1/52 | (2006.01) | |
| H04L 27/04 | (2006.01) | |
| H04L 25/49 | (2006.01) | |
| H04L 25/03 | (2006.01) | |
| H04B 17/10 | (2015.01) | |

(52) U.S. Cl.
CPC .......... *H04L 25/4917* (2013.01); *H04B 17/104* (2015.01); *H04L 25/03343* (2013.01)

(58) Field of Classification Search
CPC ............................. H04B 3/32; H04L 25/4917
USPC ......................................... 375/295, 300, 353
See application file for complete search history.

(56) References Cited

U.S. PATENT DOCUMENTS

| | | | |
|---|---|---|---|
| 7,072,415 B2 * | 7/2006 | Zerbe ................... | G11C 7/1051 375/286 |
| 7,308,048 B2 | 12/2007 | Wei | |
| 7,945,884 B1 * | 5/2011 | Goergen et al. ............... | 716/126 |
| 8,861,578 B1 | 10/2014 | Lusted et al. | |
| 2001/0037676 A1 | 11/2001 | Chang | |
| 2005/0135413 A1 | 6/2005 | Yang et al. | |
| 2008/0181289 A1 | 7/2008 | Moll | |
| 2009/0230947 A1 | 9/2009 | Sumita | |
| 2009/0238301 A1 * | 9/2009 | Cheung ........................ | 375/291 |
| 2011/0311008 A1 * | 12/2011 | Slezak .................... | H03M 9/00 375/353 |

OTHER PUBLICATIONS

International Search Report and Written Opinion received for PCT Patent Application No. PCT/US2014/042716, mailed on Oct. 8, 2014, 15 pages.

* cited by examiner

*Primary Examiner* — Shuwang Liu
*Assistant Examiner* — Gina McKie
(74) *Attorney, Agent, or Firm* — Law Office of R. Alan Burnett, P.S.

(57) ABSTRACT

Methods, apparatus and systems for measuring signal transition times for a four-level pulse modulated amplitude (PAM4) transmitter. During a test procedure, a PAM4 transmitter is configured to repetitively transmit a PAM4 symbol test pattern, which is captured as a signal waveform. The test pattern includes at least one rising signal sequence having a PAM4 symbol pattern of at least three −1 PAM4 symbols followed by at least three +1 PAM4 symbols and at least one falling signal sequence having a PAM4 symbol pattern of at least three +1 PAM4 symbols followed by at least three −1 PAM4 symbols. A voltage modulation amplitude (VMA) level for each of a −1 and +1 PAM4 signal level is measured for at least one rising signal sequence and falling signal sequence to derive 20% and 80% VMA levels. A rise transition time is then determined by measuring the time interval between when a rising signal crosses the 20% and 80% VMA levels, and a fall transition time is determined by measuring the time interval between when a falling signal crosses the 80% and 20% VMA levels.

27 Claims, 26 Drawing Sheets

PAM4 Encoding

3 ⇒ +1
2 ⇒ +1/3
1 ⇒ −1/3
0 ⇒ −1

| PMD Lane | Seed bits (leftmost bit in S0, rightmost in S12) | Initial 16 bits (in order of transmission) |
|---|---|---|
| 0 | 0000010101011 | 0100100110110011 |
| 1 | 0011101000001 | 1101111101010100 |
| 2 | 1001000101100 | 1100101111000011 |
| 3 | 0100010000010 | 0110111101000111 |

Lane 0 Fall and Rise Run Results

| Fall | +1 | -1 | | | Fall | +1 | -1 | | |
|------|----|----|------|------|------|----|----|------|------|
| Rise | -1 | +1 | Fall | Rise | Rise | -1 | +1 | Fall | Rise |
| | 1 | 1 | 943 | 907 | | 5 | 1 | 1 | 2 |
| | 1 | 2 | 253 | 236 | | 5 | 2 | 0 | 0 |
| | 1 | 3 | 65 | 57 | | 5 | 3 | 0 | 0 |
| | 1 | 4 | 16 | 9 | | 5 | 4 | 0 | 0 |
| | 1 | 5 | 2 | 0 | | 5 | 5 | 0 | 0 |
| | 1 | 6 | 2 | 0 | | 5 | 6 | 0 | 0 |
| | 1 | 7 | 0 | 0 | | 5 | 7 | 0 | 0 |
| | 2 | 1 | 243 | 237 | | 6 | 1 | 0 | 1 |
| | 2 | 2 | 61 | 50 | | 6 | 2 | 0 | 0 |
| | 2 | 3 | 14 | 13 | | 6 | 3 | 0 | 0 |
| | 2 | 4 | 1 | 3 | | 6 | 4 | 0 | 0 |
| | 2 | 5 | 0 | 0 | | 6 | 5 | 0 | 0 |
| | 2 | 6 | 0 | 0 | | 6 | 6 | 0 | 0 |
| | 2 | 7 | 0 | 0 | | 6 | 7 | 0 | 0 |
| | 3 | 1 | 56 | 64 | | 7 | 1 | 0 | 0 |
| | 3 | 2 | 16 | 13 | | 7 | 2 | 0 | 0 |
| | 3 | 3 | 3 | 2 | | 7 | 3 | 0 | 0 |
| | 3 | 4 | 0 | 0 | | 7 | 4 | 0 | 0 |
| | 3 | 5 | 0 | 0 | | 7 | 5 | 0 | 0 |
| | 3 | 6 | 0 | 0 | | 7 | 6 | 0 | 0 |
| | 3 | 7 | 0 | 0 | | 7 | 7 | 0 | 0 |
| | 4 | 1 | 8 | 16 | | | | | |
| | 4 | 2 | 0 | 1 | | | | | |
| | 4 | 3 | 0 | 0 | | | | | |
| | 4 | 4 | 0 | 0 | | | | | |
| | 4 | 5 | 0 | 0 | | | | | |
| | 4 | 6 | 0 | 0 | | | | | |
| | 4 | 7 | 0 | 0 | | | | | |

*Fig. 9*

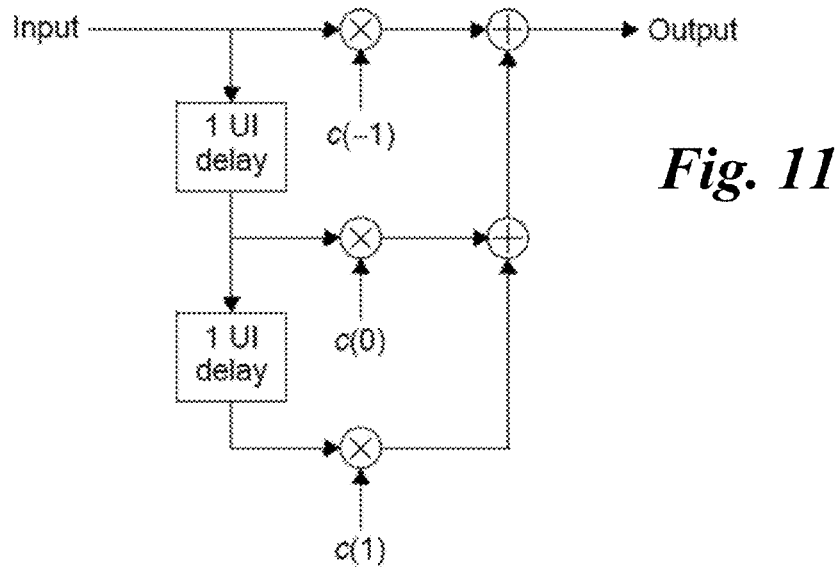

*Fig. 11*

| Cell(s) | Name | Description |
|---|---|---|
| 15:14 | Reserved | Transmitted as 0, ignored on reception. |
| 13 | Preset | 1 = Preset coefficients<br>0 = Normal operation |
| 12 | Initialize | 1 = Initialize coefficients<br>0 = Normal operation |
| 11:7 | Reserved | Transmitted as 0, ignored on reception. |
| 6 | Parity | Even parity of all other coefficient update cells. |
| 5:4 | Coefficient (+1) update | 5 4<br>1 1 = reserved<br>0 1 = increment<br>1 0 = decrement<br>0 0 = hold |
| 3:2 | Coefficient (0) update | 3 2<br>1 1 = reserved<br>0 1 = increment<br>1 0 = decrement<br>0 0 = hold |
| 1:0 | Coefficient (−1) update | 1 0<br>1 1 = reserved<br>0 1 = increment<br>1 0 = decrement<br>0 0 = hold |

*Fig. 12*

| Cell(s) | Name | Description |
|---|---|---|
| 19 | Parity | Set to achieve even parity for status report field. |
| 18 | Mode | 0: Training<br>1: EEE |
| 17:16 | Frame countdown | Number of frames remaining before transition to data mode. |
| 15:13 | PMA alignment offset | Relative location of the next alert frame within the PMA frame (set to zero for training frames). |
| 12:7 | Reserved | Transmitted as zeros. |
| 6 | Receiver ready | 1 = The local receiver has determined that training is complete and is prepared to receive data.<br>0 = The local receiver is requesting that training continue. |
| 5:4 | Coefficient (+1) status | 5 4<br>1 1 = maximum<br>1 0 = minimum<br>0 1 = updated<br>0 0 = not_updated (and for EEE alert frames) |
| 3:2 | Coefficient (0) status | 3 2<br>1 1 = maximum<br>1 0 = minimum<br>0 1 = updated<br>0 0 = not_updated (and for EEE alert frames) |
| 1:0 | Coefficient (−1) status | 1 0<br>1 1 = maximum<br>1 0 = minimum<br>0 1 = updated<br>0 0 = not_updated (and for EEE alert frames) |

*Fig. 13*

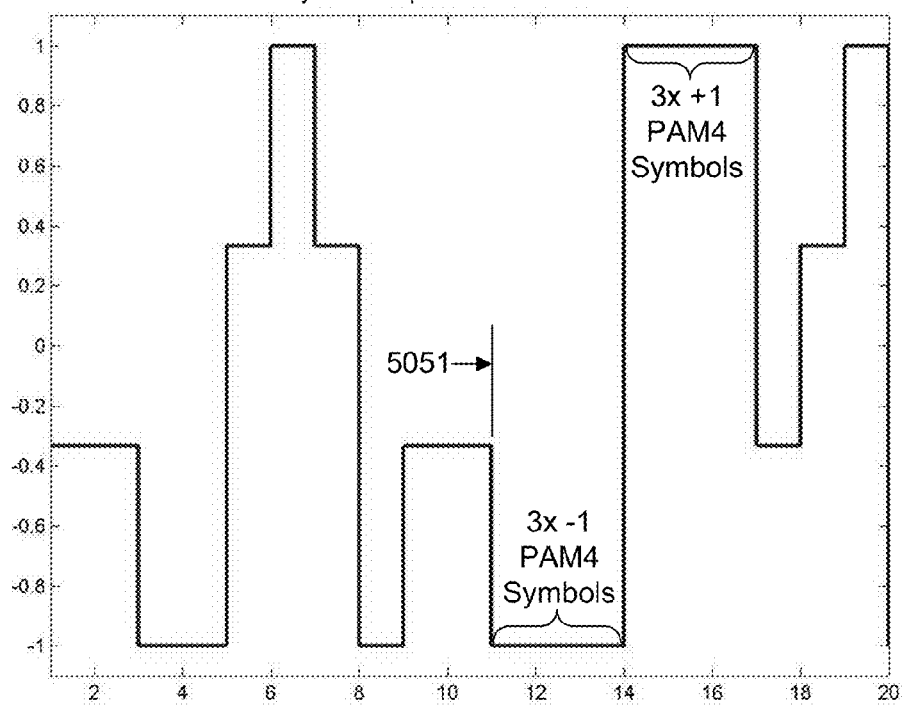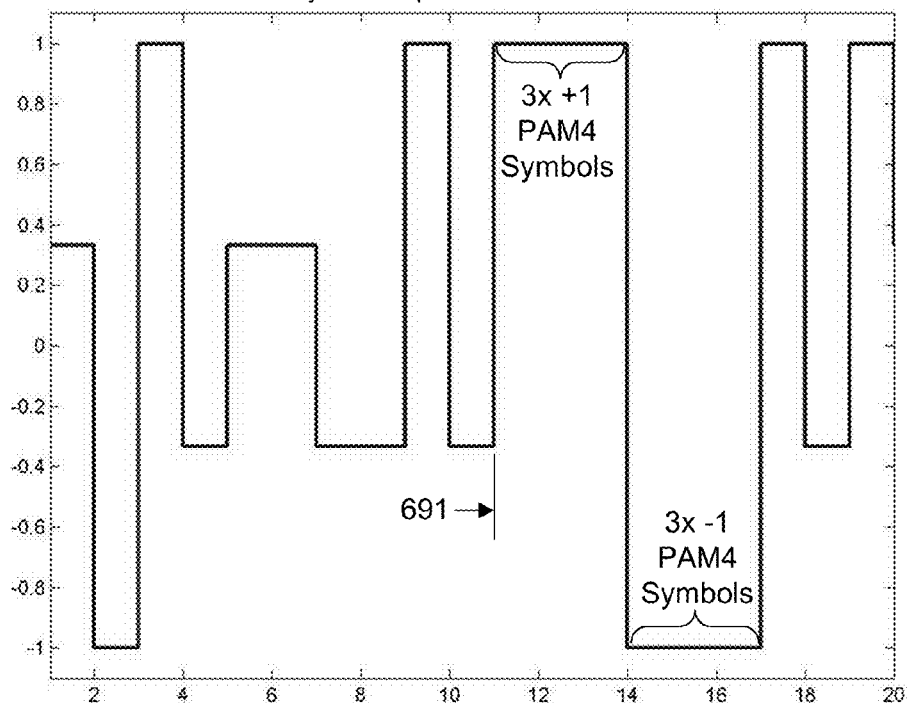
*Fig. 14a*

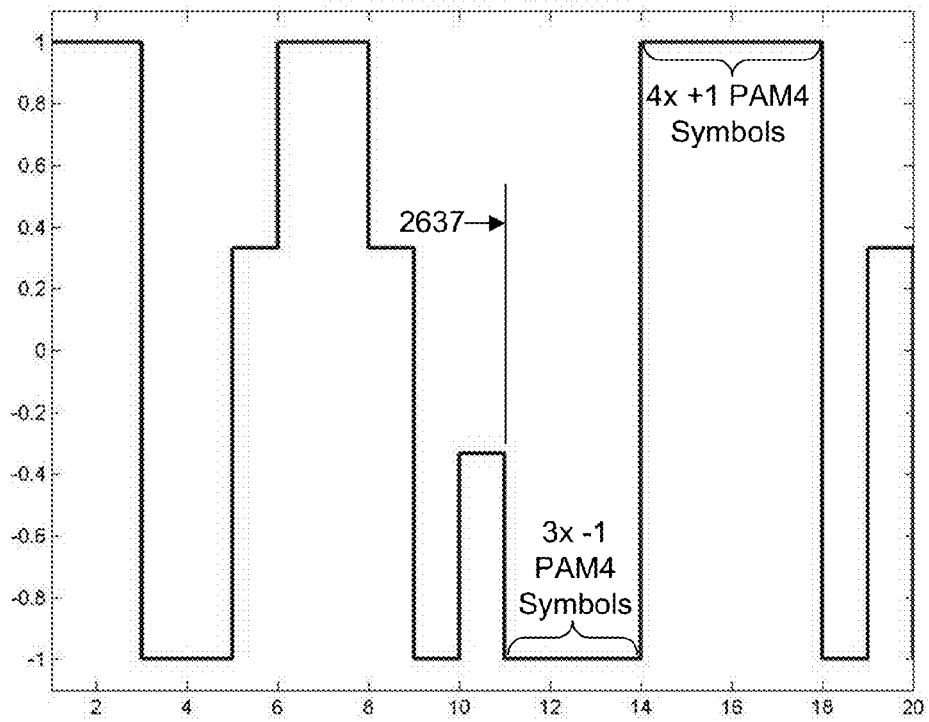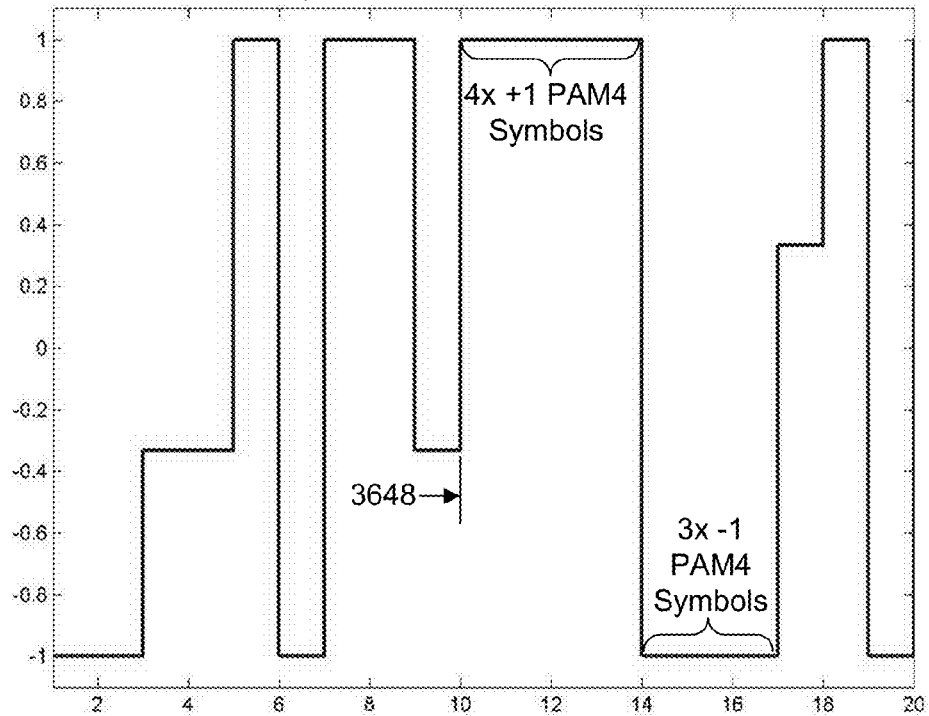
Fig. 14b

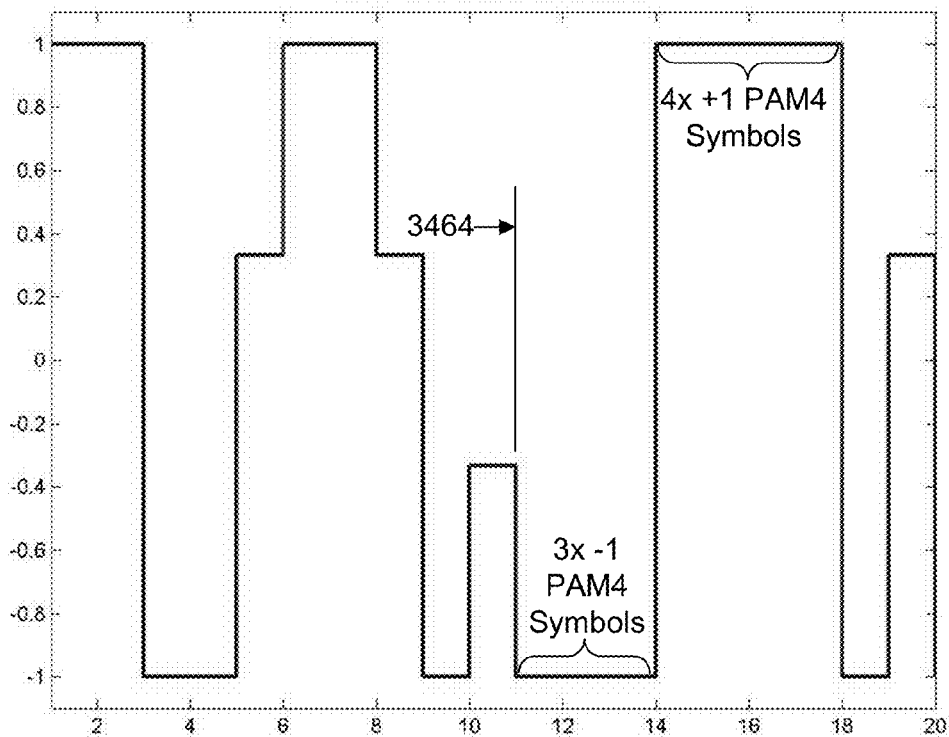
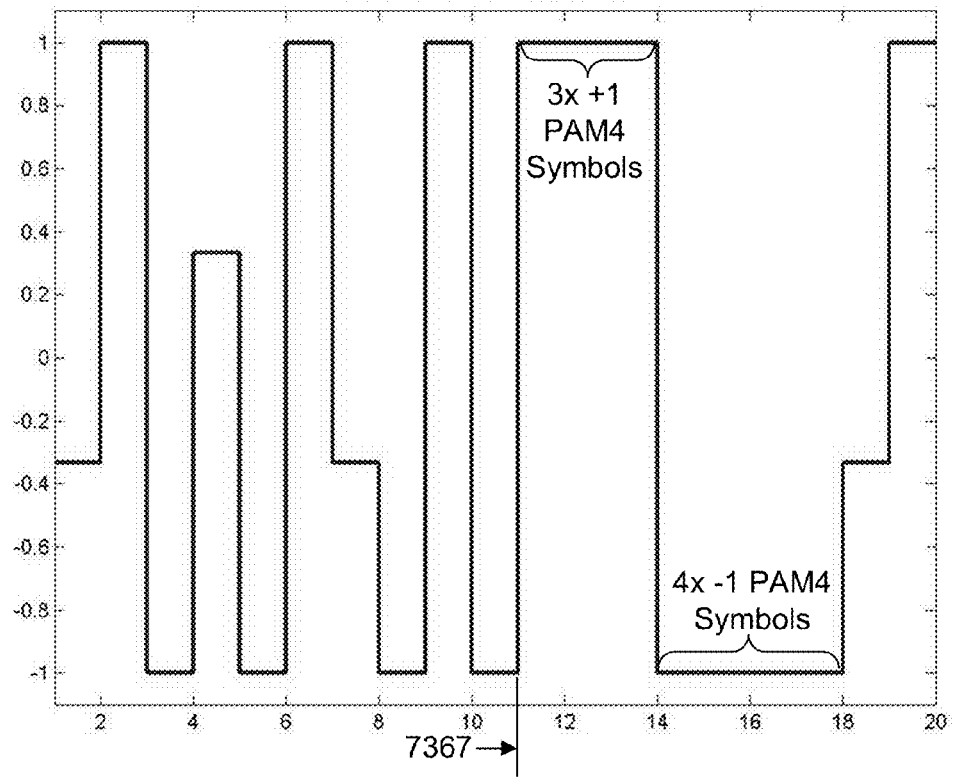
Fig. 14c

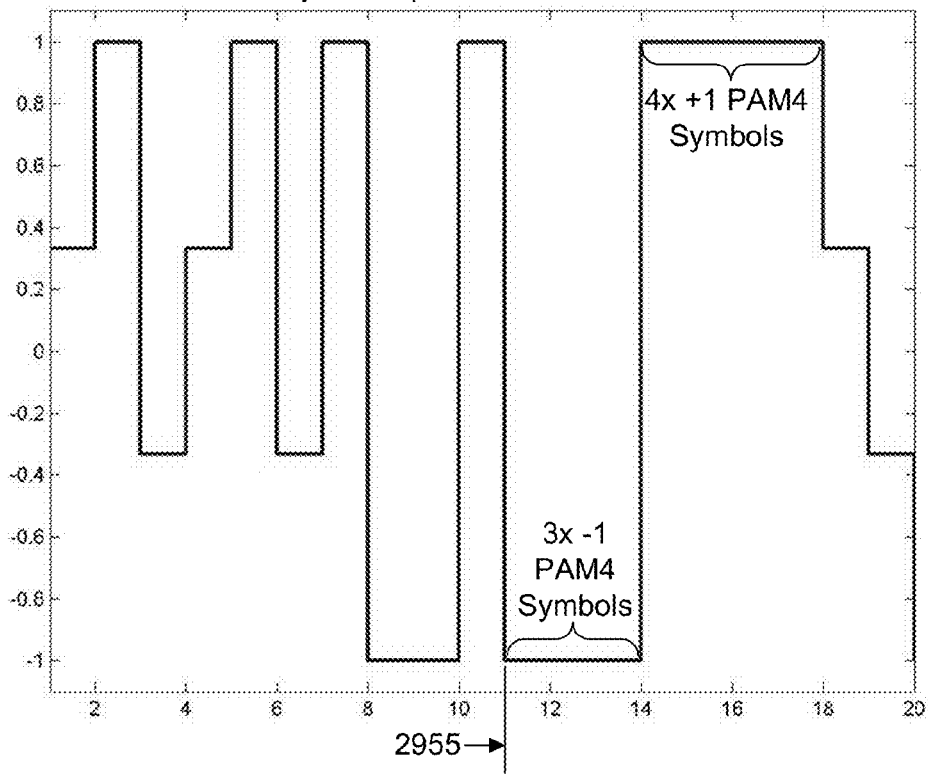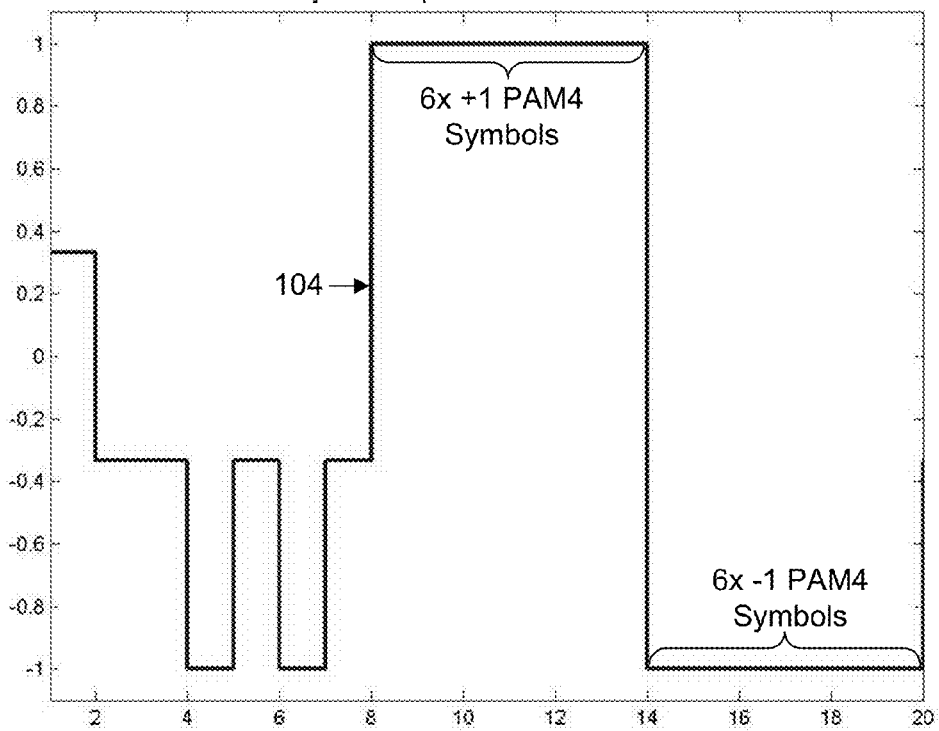
Fig. 14d $$G(x)=1+x+x^2+x^{12}+x^{13}$$

| PMD Lane | Output of | Contents of first (top) and second (bottom) training frame words transmitted left to right |
|---|---|---|
| 0 | PRBS13 | 0100100110110011100010101100001001001110111100111001000011 1010011011010011001001010111 0001111110101101101111101000101101111101001110110010101110 0111001011000111100001101011 |
| | Gray code | (illegible) |
| | Precoder | (illegible) |
| 1 | PRBS13 | (illegible) |
| | Gray code | (illegible) |
| | Precoder | (illegible) |
| 2 | PRBS13 | (illegible) |
| | Gray code | (illegible) |
| | Precoder | (illegible) |
| 3 | PRBS13 | (illegible) |
| | Gray code | (illegible) |
| | Precoder | (illegible) |

*Fig. 17*

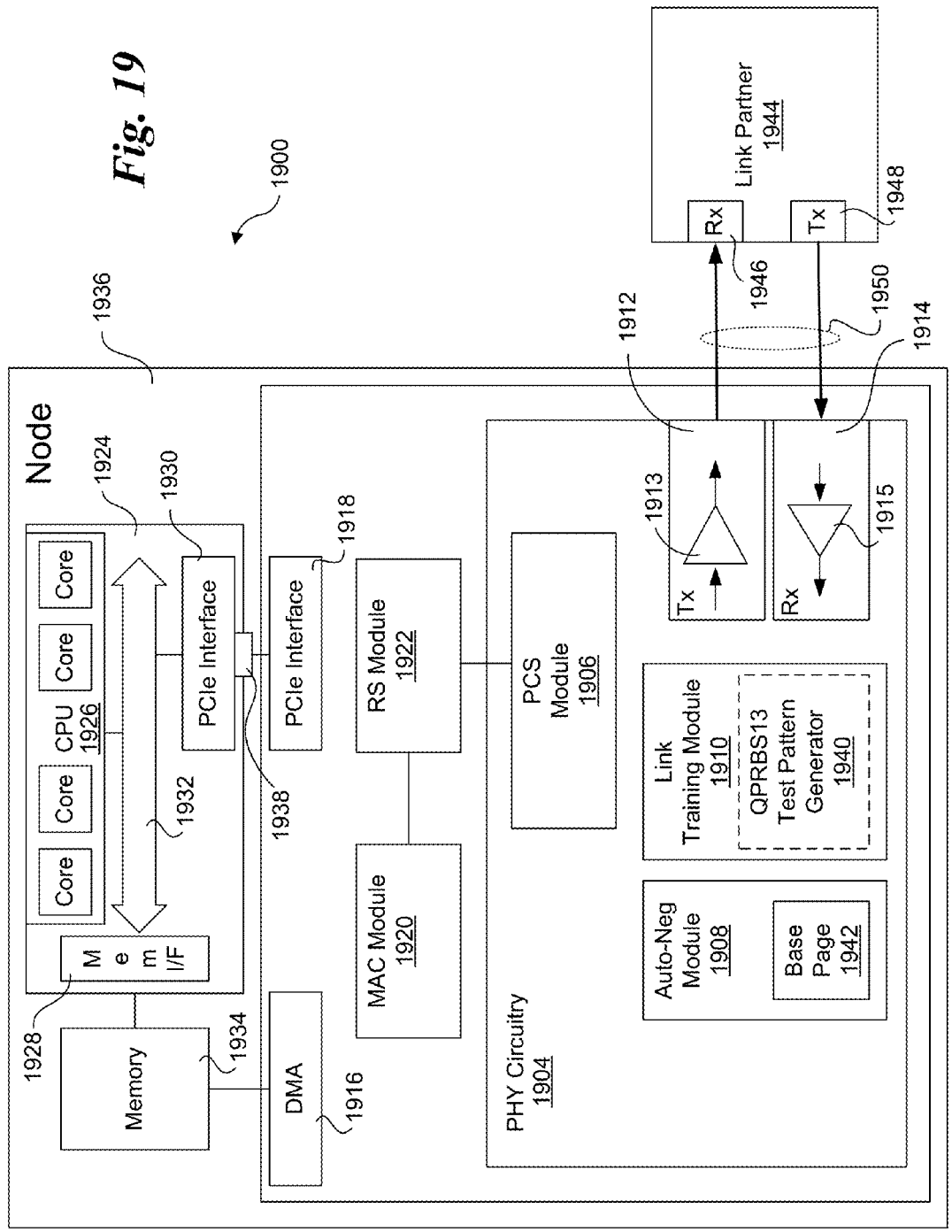

US 9,264,270 B2

TRANSITION TIME MEASUREMENT OF PAM4 TRANSMITTERS

FIELD OF THE INVENTION

The field of invention relates generally to high-speed interconnects and, more specifically but not exclusively relates to techniques for measuring signal transition times for a four-level pulse modulated amplitude (PAM4) transmitter.

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever substantial capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services which employ private network infrastructure.

A typical data center deployment includes a large number of server racks, each housing multiple rack-mounted servers or blade servers. Communications between the rack-mounted servers is typically facilitated using the Ethernet (IEEE 802.3) protocol over copper wire cables. In addition to the option of using wire cables, blade servers and network switches and routers may be configured to support communication between blades or cards in a rack over an electrical backplane or mid-plane interconnect.

In recent years, the speed of Ethernet connections over copper wiring has reached the 10 Gigabits per second (Gpbs) and 40 Gpbs level. Moreover, The IEEE (Institute of Electrical and Electronics Engineers) is currently developing a specification (IEEE 802.3bj) defining a new backplane PHY type called 100GBASE-KP4 that is targeted for a bandwidth of 100 Gbps over electrical backplanes with a loss up to 33 dB at 7 GHz. A similar specification for a new 100 Gbps over a cable connection is also being defined by the IEEE.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5b is a schematic diagram illustrating further details of selected LAN CSMA/CD layers in FIG. 5a;

FIG. 9 shows the fall and run results for lane 0 using the seed value shown in FIG. 8b.

FIG. 11 is a schematic diagram illustrating a functional model for a transmit equalizer, according to one embodiment;

FIG. 12 is a table illustrating exemplary encodings for cells in Coefficient Update fields;

FIG. 13 is a table illustrating exemplary encodings for cells in Status Report fields;

FIG. 14a shows an exemplary rise symbol sequence for lane 0 at an offset of 5051 and an exemplary fall symbol sequence for lane 0 at an offset of 691.

FIG. 14b shows an exemplary rise symbol sequence for lane 1 at an offset of 2637 and an exemplary fall symbol sequence for lane 1 at an offset of 3648.

FIG. 14c shows an exemplary rise symbol sequence for lane 2 at an offset of 3464 and an exemplary fall symbol sequence for lane 2 at an offset of 7367.

FIG. 14d shows an exemplary rise symbol sequence for lane 3 at an offset of 2955 and exemplary fall symbol sequence for lane 0 at an offset of 104.

FIG. 17 illustrates an exemplary set of four PRBS13 initiation states;

FIG. 19 is a schematic diagram illustrating an architecture for a network node employing a network chip configured to meet the transmitter rise and fall transition time requirements defined for a 100GBASE-KP4 transmitter.

DETAILED DESCRIPTION

Embodiments of methods, apparatus and systems for measuring signal transition times for four-level pulse modulated amplitude (PAM4) transmitters are described herein. In the following description, numerous specific details are set forth (such as implementation of a PAM4 transmitter for a 100 Gbps Ethernet link) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments for measuring transition times for PAM4 transmitters including the transmitters for the proposed 100GBASE-KP4 PHY are disclosed herein. In order to preserve compatibility with existing training mechanisms, some aspects of link training for the 100GBASE-KP4 PHY are common to similar aspects defined for the IEEE 10GBASE-KR PHY, which is targeted at 10 Gbps links and is currently employed in various types of equipment such as switches and routers. Additionally, there are other common aspects that are defined in IEEE Std 802.3-2012. While these common aspects may be identified and briefly discussed herein, corresponding detailed discussions of how these aspects may operate or be implemented are generally not provided herein in order to not obscure inventive aspects of the embodiments. Other aspects of some embodiments are described in further detail in IEEE P802.3bj Draft 2.1.

Figures 1, 2:
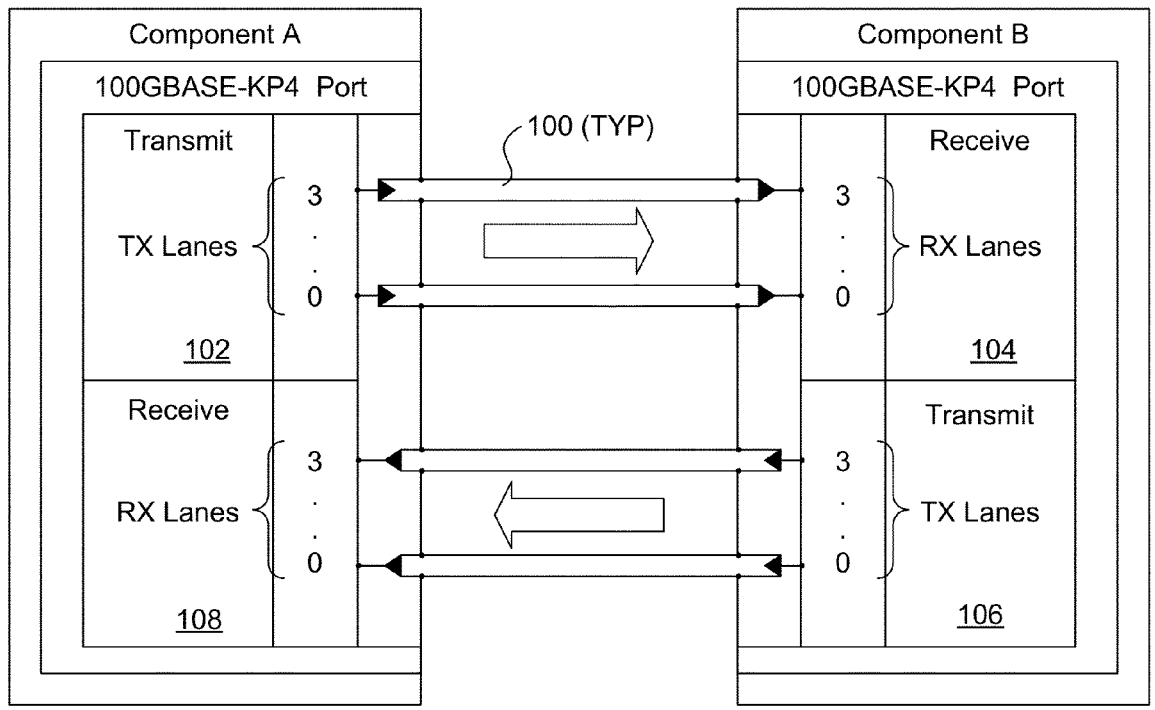
FIG. 1 is a schematic diagram illustrating the structure of a 100GBASE-KP4 link, according to one embodiment.
FIG. 2 is a diagram illustrating mapping for PAM4 encoding.

The Physical layer (also referred to a "PHY") structure of one embodiment of a 100GBASE-KP4 link is illustrated in FIG. 1. The PHY defines the physical structure of the interconnect and is responsible for dealing with details of operation of the signals on a particular link between two link partners, such as depicted by components A and B. This layer manages data transfer on the signal wires, including electrical levels, timing aspects, and logical issues involved in sending and receiving each bit of information across the parallel lanes. As shown in FIG. 1, the physical connectivity of each interconnect link is made up of four differential pairs of signals 100, comprising lanes 0-3 in each direction. Each port supports a link pair consisting of two uni-directional links to complete the connection between two components. This supports traffic in both directions simultaneously.

Components with 100GBASE-KP4 ports communicate using a pair of uni-directional point-to-point links, defined as a link pair, as shown in FIG. 1. Each port comprises a Transmit (Tx) link interface and a Receive (Rx) link interface. For the illustrated example, Component A has a Tx port 102 that is connected to Component B Rx port 104. Meanwhile, Component B has a Tx port 104 that is connected to Component B Rx port 108. One uni-directional link transmits from Component A to Component B, and the other link transmits from Component B to Component A. The "transmit" link and "receive" link is defined relative to which component port is transmitting and which is receiving data. In the configuration illustrated in FIG. 1, the Component A transmit link transmits data from the Component A Tx port 102 to the Component B Rx port 104. This same Component A transmit link is the Port B receive link.

The 100GBASE-KP4 PHY uses a four-level pulse amplitude modulation (referred to as PAM4) signal to send and receive data across the channel. As shown in FIG. 2, PAM4 consists of four logical levels that are mapped as follows:

0 maps to $-1$
1 maps to $-\frac{1}{3}$
2 maps to $+\frac{1}{3}$
3 maps to $+1$

Logical levels 0 and 3 respectively correspond to low and high level signals having signal levels $-1$ and $+1$, while logical levels 1 and 2 correspond to intermediate level signals have signal levels $-\frac{1}{3}$ and $+\frac{1}{3}$.

The physical signaling for the 100GBASE-KP4 PHY employs a Unit Interval (UI) having a time corresponding to 13.59375 Gbd symbols (~73.6 psec (picosecond)). In one embodiment a Training Frame Word (TFW) of 46 UI is employed for link training Each TFW corresponds to one full 92-bit terminated blocks (TB92).

Figure 3:
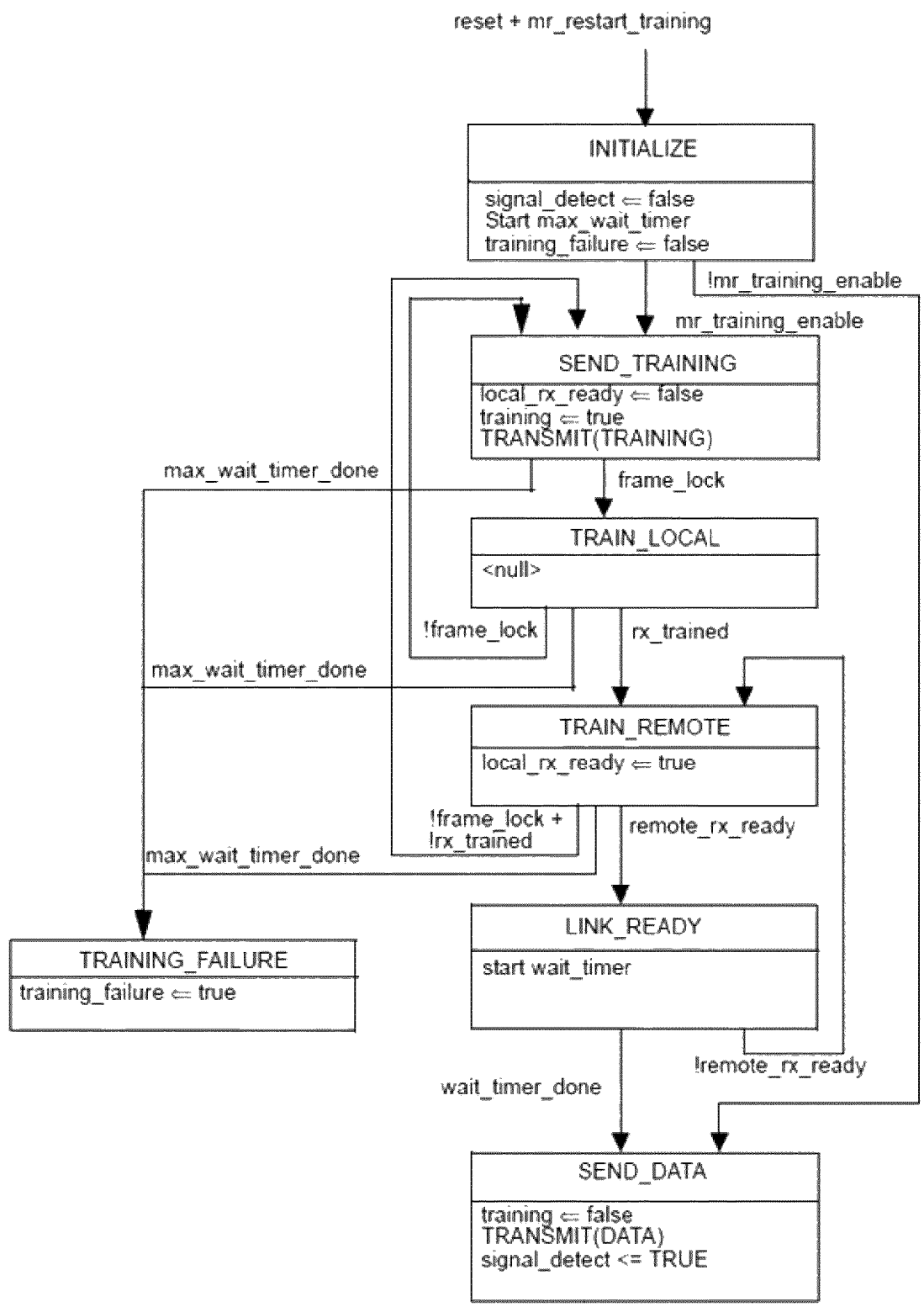
FIG. 3 is a training state diagram for a 10GBASE-KR PHY.

In one embodiment, the format for the training sequence for the 100GBASE-KP4 PHY is similar to that employed for the 10GBASE-KR PHY defined in the IEEE Std. 802.3-2012 specification. The training state diagram for 10GBASE-KR PHY is shown in FIG. 3. A significant difference between the 10GBASE-KR PHY and the 100GBASE-KP4 PHY is that the former defines a NRZ (Non-return to Zero) two-level (PAM2) PHY rather than a four-level PAM4 signal.

Figure 4A:
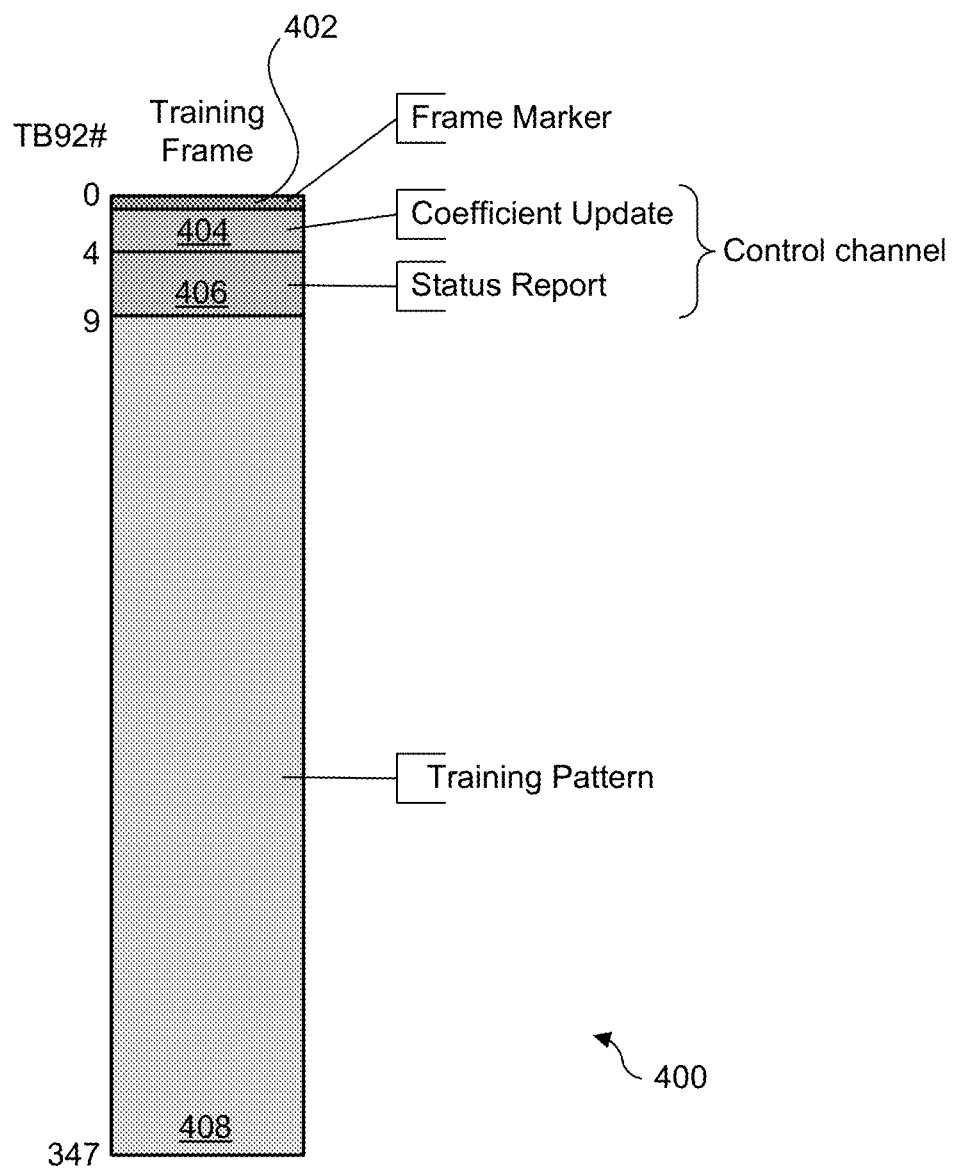
FIG. 4a is a diagram showing the components of a training frame, according to one embodiment.
Figure 4B:
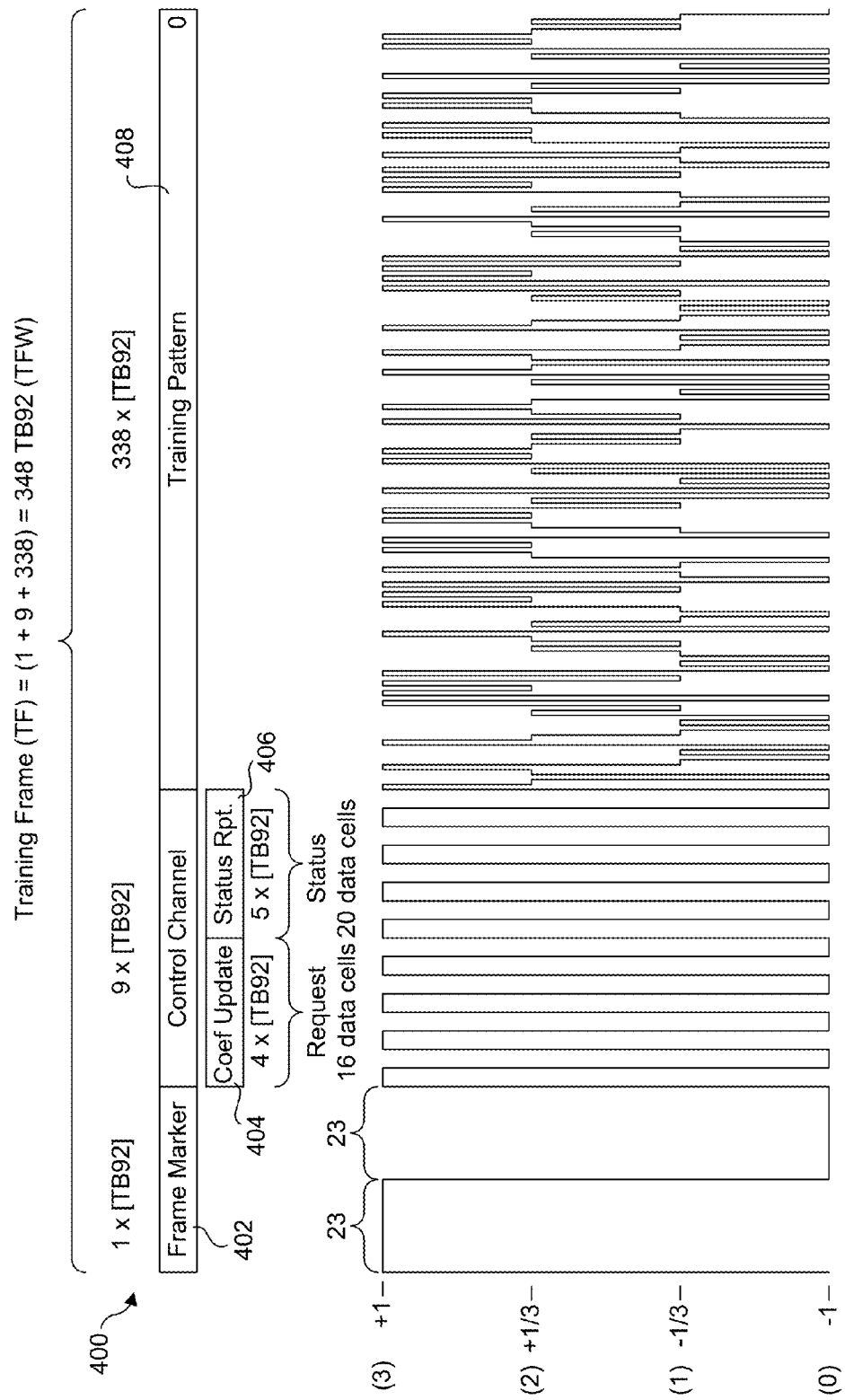
FIG. 4b is a schematic diagram illustrating a training frame and exemplary signaling, according to one embodiment.

The 100GBASE-KP4 link is established using the following sequence:
(1) Auto-negotiate capabilities to link partner
(2) Send out training sequence to tune PHY for the channel's characteristics
  Obtain Frame Lock
  TX FFE handshake: Adapt Tx coefficients to channel characteristics
  DSP converged: Train Rx to channel
  Status Exchange: Ready or not?
(3) Countdown to data mode and Send out idle symbols The training frame is a fixed length structure that is sent continuously during training. As shown in FIG. 4a, in one embodiment, a training frame 400 includes a Frame Marker 402 comprising 1 TB92, a Control Channel including a Coefficient Update 404 comprising 4 TB92 and a Status Report 406 comprising 5 TB92, and a Training Pattern 408 comprising 338 TB92 for a total of length of 348 TB92s or 348 TFWs. Further details of training frame 400 are shown in FIG. 4b and discussed below.

In one embodiment, training Frames are delimited by the bit pattern, hexadecimal 3FFFFFF800000 (23 ones followed by 23 zeros in which the ones are +1 PAM4 symbols and the zeros are −1 PAM4 symbols), as expressed in 13.59375 Gbd symbols. This is illustrated by the Frame Markers shown in FIG. 4b.

Figure 5A:
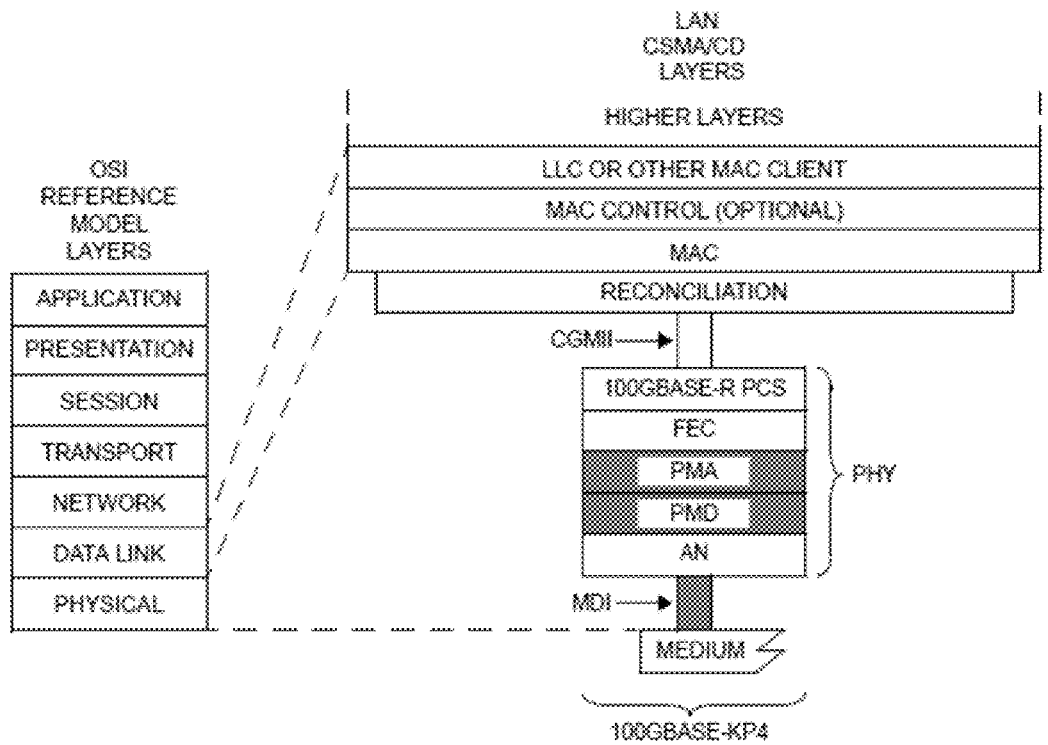
FIG. 5a is a schematic diagram illustrating the relationship between the Data Link and Physical layers of the OSI reference model and IEEE 802.3 LAN CSMA/CD LAN model layers corresponding to the current draft of 100GBASE-KP4 defined in IEEE P802.3bj Draft 1.2.
Figure 5B:
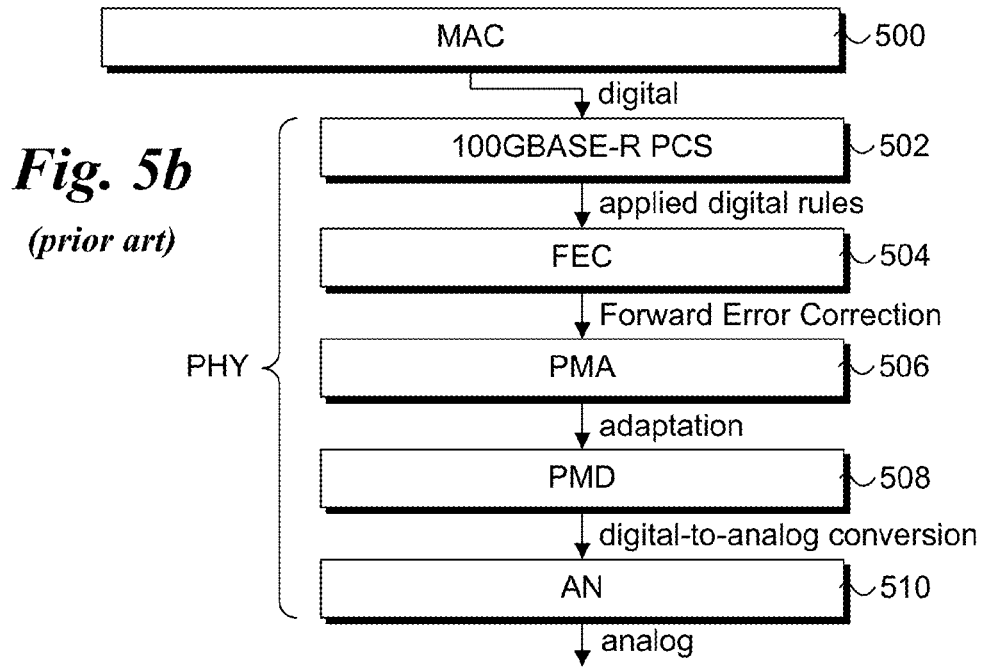

FIG. 5a shows details of the relationship between the Data Link and Physical layers of the OSI reference model and IEEE 802.3 LAN CSMA/CD LAN model layers corresponding to the current draft of 100GBASE-KP4 defined in IEEE P802.3bj Draft 1.2. FIG. 5b shows further details of selected LAN CSMA/CD layers, including a MAC (Media Access Control) layer 500, a 100GBASE-R Physical Coding Sublayer (PCS) sublayer 502, a Forward Error Correction (FEC) sublayer 504, a Physical Media Attachment (PMA) sublayer 506, a Physical Media Dependent (PMD) sublayer 508, and an Auto-Negotiation (AN) sublayer 510. Data is received in digital format as a binary bit stream by MAC layer 500, which processes and forwards the binary data to 100GBASE-R PCS sublayer 502, which applies digital rules to the binary data to transform the data as described below. The transformed digital data are then passed to FEC sublayer 504, which performs Forward Error Correction. FEC uses the coding gain to increase the link budget and BER performance on a given channel. The link budget consists of the electrical parameters which define the connection between the transmit circuitry and the receive circuitry, such as insertion loss, return loss, pulse response, etc.

In the transmit direction, the role of PMA sublayer 506 is to adapt the signal output by FEC sublayer 504 to a PAM4 encoded signal to be passed to PMD sublayer 508 and AN sublayer 510 for transfer over the attached medium. One embodiment of the adaptation processes shown in FIG. 6 includes an insert overhead block 602, an insert termination bits block 604, a Gray coding block 606, a [1/(1+D) mod 4] precoding block 608, and a PAM4 encoding block 610.

Figure 6:
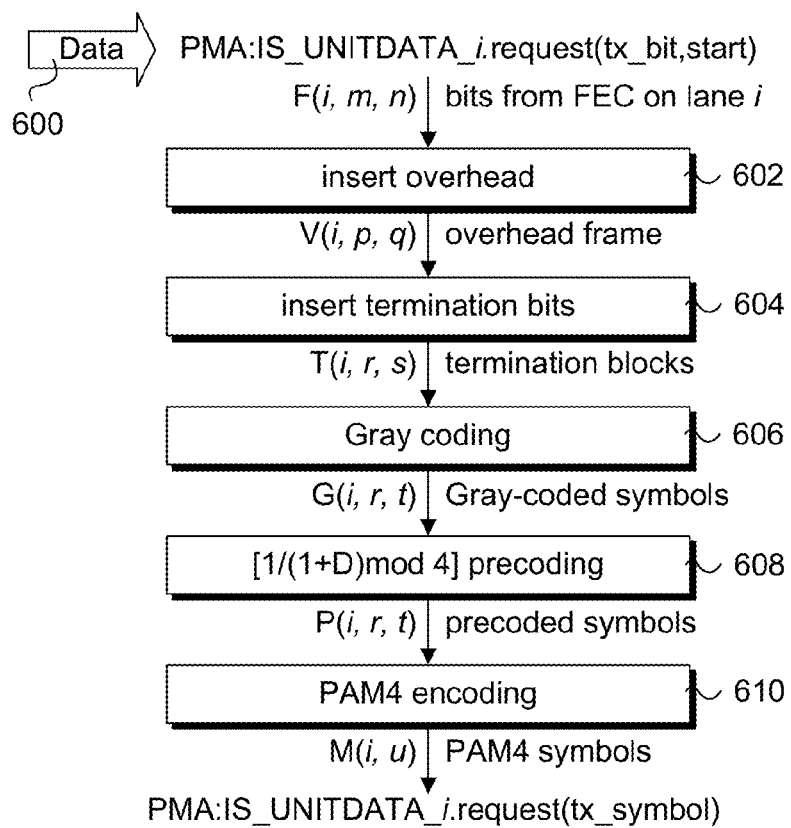
FIG. 6 is a transmit adaption process diagram illustrating operations performed by the PMA sublayer during link up transmit operations.

In further detail, incoming data 600 in FIG. 6 is received by PMA sublayer 506 from FEC sublayer 504 comprising a PMA:IS_UNITDATA_i.request (where i=0 to 3) primitive used to define the transfer of four streams of a data from the PMA client to PMA. The data conveyed by PMA:IS_UNITDATA_0.request to PMA:IS_UNITDATA_3.request consists of four parallel streams of encoded bits, one stream for each of lanes 0-3. Each tx_bit parameter is either a '1' or '0'. The start parameter is TRUE to indicate that the concurrent tx_bit is the first bit of the first, second, third, or fourth FEC symbol in the FEC codeword, or is otherwise FALSE. On each transaction, tx-bit is assigned F(i, m, n), where i is the lane number, m is an index indicating the FEC codeword number and increments at the start of each codeword, and n is an index indicating the bit number within the codeword.

Insert overhead block 602 creates a sequence of overhead frames by inserting 40 overhead bits for every 31280 FEC bits. The FEC bits, F(i, m, n) are mapped into a continuous sequence of overhead frames. The overhead frame is 31320 bits in length. Each bit in the overhead frame is denoted V(i, p, q), where: i is the lane number; p is an index that indicates the frame number and increments at the start of each frame; and q is an index that indicates the bit number within a frame with a range 1 to 31320. The first 40 bits of the frame, V(i, p, 1) to V(i, p, 40) are the overhead bits. The next 31280 bits, V(i, p, 41) to Vi, p, 31320) are composed of the bits from 23 consecutive FEC codewords.

The overhead bits are inserted in the frame as follows:
V(i, p, 1)=H(i, p, 1)
V(i, p, 2)=H(i, p, 2)
V(i, p, . . . )=H(i, p, . . . )
V(i, p, 40)=H(i, p, 40)
The FEC codeword bits are aligned such that V(i, p, 41) is the first bit of a codeword, e.g., V(i, p, 41)=F(i, m, 1). The FEC bits are inserted into the frame in the order in which they were received from the FEC, e.g., V(i, p, 42)=F(i, m, 2), V(i, p, 43)=F(i, m, 3), and so on.

Insert termination bits block 604 creates a sequence of termination blocks by inserting a two termination bits for every 90 overhead frame bits. The termination block is the 92 bits in length, the same as a TFW. Each bit in a termination block is denoted T(i, r, s), where: i is the lane number; r is an index indicating block number and increments at the start of each block; and s is an index indicating the bit number within a termination block with a range 1 to 92. The first two bits of each termination block, T(i, r, 1) and T(i, r, 2) are populated with the output of a 13-bit Pseudo Random Bit Sequence (PRBS13) Generator R(i,v), where T(i, r, 1)=R(i,v) and T(i, r, 2)=R(i,v+1). The remaining 90 bits of each termination block, T(i, r, 3) to T(i, r, 92), are overhead frame bits, as discussed above. The frame bits are aligned with the termination blocks such that the first bit of an overhead bit, V(i, p, 1), corresponds to the third bit of a termination block, T(i, r, 3). Overhead frame bits are mapped to the termination blocks in order of location within the overhead frame, e.g., T(i, r, 4)=V(i, p, 2), T(i, r, 5)=V(i, p, 3), and so on. The termination bit PRBS13 generator is initialized during the training process. When training is complete the state of the termination bit PRBS13 generator is retained and the resulting output is used for the termination bits in the PMA frame.

The PMA sublayer next maps consecutive pairs of bits to one of four Gray-coded via Gray coding block 606. Each pair of bits, {A, B}, of each termination block are converted to a Gray-coded symbol with one of the four Gray-coded levels as follows:
{0, 0} maps to 0,
{0, 1} maps to 1,
{1, 1} maps to 2, and
{1, 0} maps to 3.

Gray-coded symbols corresponding to each termination block are denoted G(i, r, t), where: i is the lane number; r is an index indicating the termination block number; and t is an index indicating the symbol number within a termination block with a range 1 to 46. Pairing of bits is such that the first two bits of each termination block, T(i, r, 1) and T(i, r, 2), form a pair. Each bit pair {T(i, r, 2t−1), T(i, r, 2t)} maps to {A, B} and the Gray-coded result is assigned to G(i, r, t). The gray-coded symbol G(i, r, 1) is formed from the first two bits of a termination block, the termination bits, thus forming a termination symbol.

Precoding of the Gray-coded symbols is next performed by [1/(1+D) mod 4] precoding block 608. The precoder output symbols are denoted, P(i, r, t), where: i is the lane number; r is an index indicating the termination block number; and t is an index indicating the symbol number within a termination block with a range 1 to 46. For each Gray-coded symbol G(i, r, t), a precoded symbol, P(i, r, t) is determined by the following algorithm:

```
If t = 1 then
    P(i, r, t) = G(i, r, t)
Else
    P(i, r, ,t) = (G(i, r, t) − P(i, r, t−1)) mod 4
End If
```

The bits contributing to the Gray-coded termination symbol, G(i, r, 1), are the termination bits. The precoding algorithm applies this symbol directly to the output rather than combining it with the previous non-deterministic symbols and thus this termination symbol is always deterministic.

The last operation performed by PMA sublayer 506 is PAM4 encoding performed by PAM4 encoding block 610. The PAM4 encoded symbols are denoted M(i, u), where i is the lane number and u is an index indicating the symbol number. Each consecutive precoder output symbol, P(i, r, t), is mapped to one of four PAM4 levels and assigned to the PAM4 encoder output M(i, u). Mapping from the precoder output symbol P(i, r, t) to a PAM4 encoded symbol M(i, u) is shown in FIG. 2 and discussed above.

Figure 7:
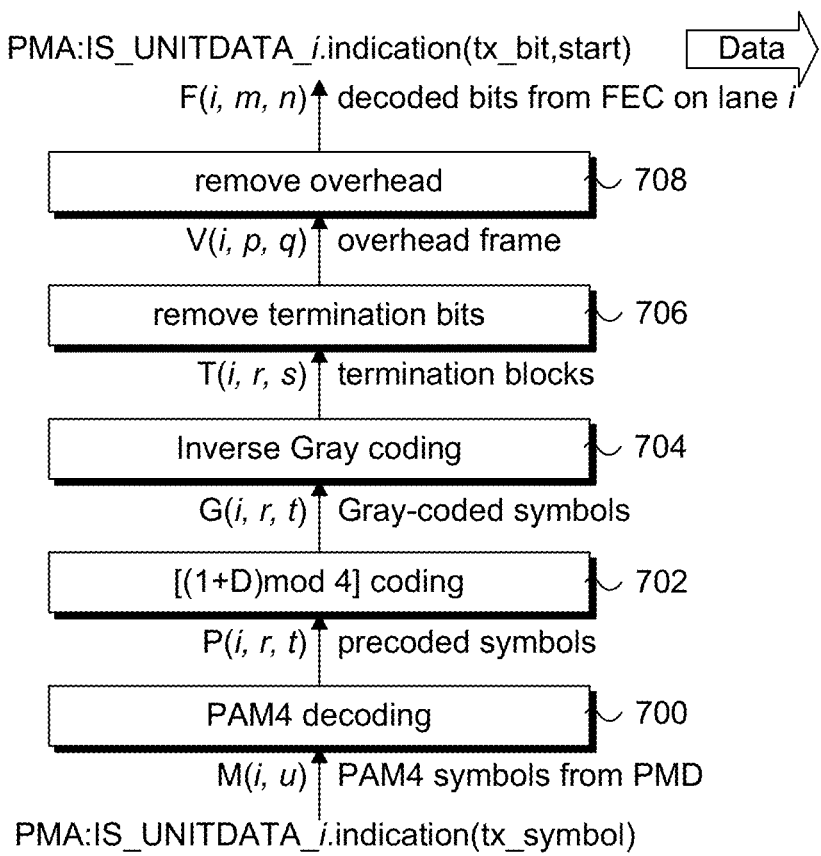
FIG. 7 is a receive adaption process diagram illustrating operations performed by the PMA sub-layer during link up receive operations.

In the received direction, the role of the 100GBASE-KP4 PMA is to adapt the PAM4 encoded signal from the PMD to a FEC encoded signal to be passed to the FEC for further processing. One embodiment of the adaptation processes are shown in FIG. 7 and include a PAM4 decoding block 700, a [(1+D) mod 4] coding block 702, an inverse Gray coding block 704, a remove termination bits block 706, and a remove overhead block 708. In general terms, each of these blocks performs an inverse operation to a corresponding block in FIG. 6 described above. Accordingly, further details are not provided herein.

Figure 6A:
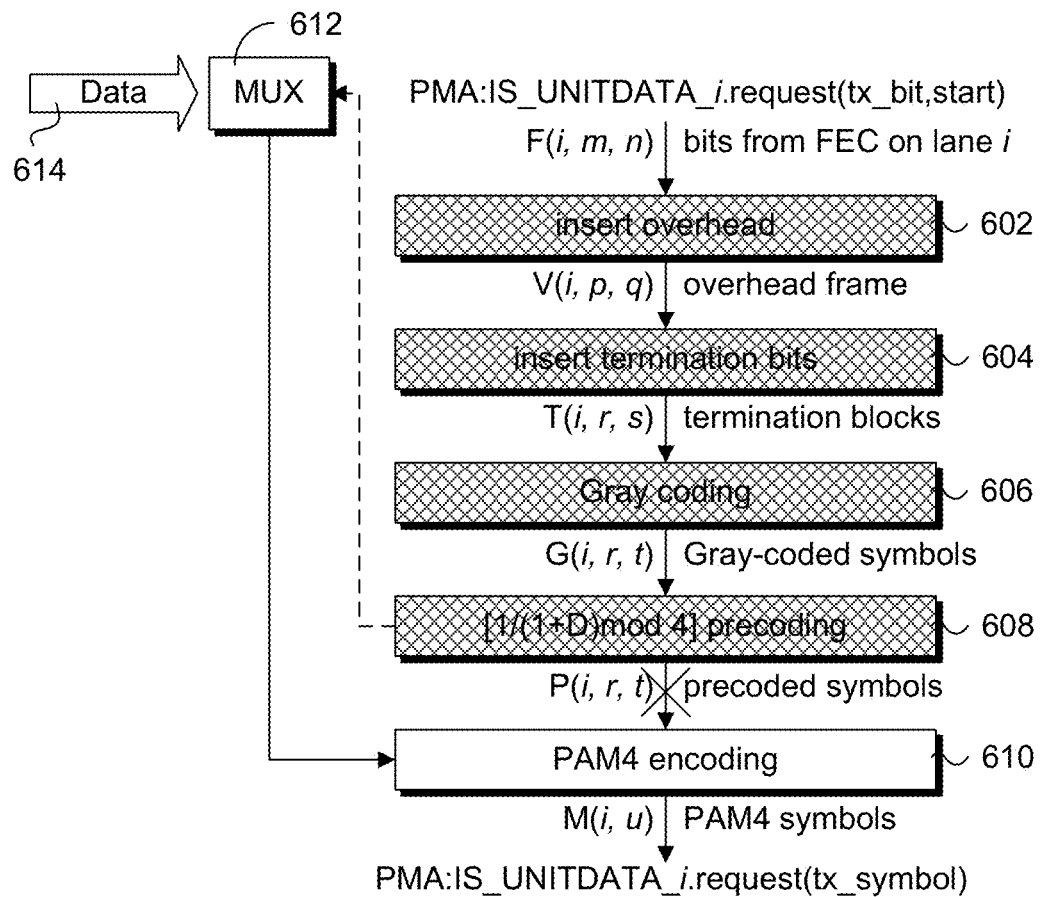
FIG. 6a is a transmit adaption process diagram illustrating operations performed by the PMA sublayer during transmission of the Frame Marker and Control Channel portions of an training frame; according to one embodiment.

To simplify the link establishment process discussed above when TRANSMIT(TRAINING) as shown in FIG. 3, the PAM4 multi-level signaling is not used for the Frame Marker, Coefficient Update, and Status Report data. During the transmission of Frame Marker 402, Coefficient Update 404, and Status Report 406, the PAM4 transmitter bypasses the overhead frame, termination block, gray coding, and 1/(1+D) mod 4 precoding stages of the PMA transmit and receive functional specifications. This is illustrated in FIG. 6a, wherein data 614 is redirected by a multiplexer (MUX) 612 to PAM4 encoding block 610, by passing each of insert overhead block 602, insert termination bits block 604, Gray coding block 606, and [1/(1+D) mod 4] precoding block 608. Therefore, the output levels are restricted to the −1 PAM4 symbol level for a logic 0 and the +1 PAM4 symbol level for a logic 1 to enable easy receiver lock to the training pattern over poor quality and non-equalized channels.

Figure 7A:
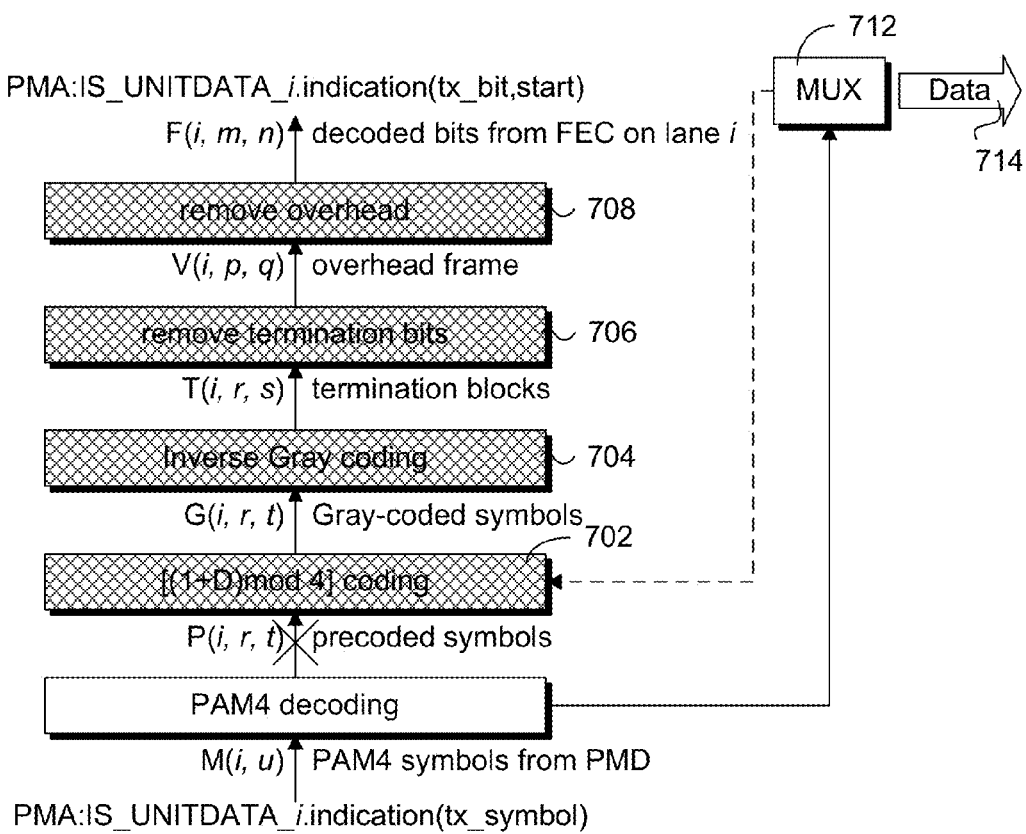
FIG. 7a is a receive adaption process diagram illustrating operations performed by the PMA sublayer during receiving of the Frame Marker and Control Channel portions of an training frame; according to one embodiment.

The corresponding receiver operations for processing received data during transmission of Frame Marker 402, Coefficient Update 404, and Status Report 406 are shown in FIG. 7a. As illustrated, a MUX 712 is configured to output data 714 from PAM4 decoding block 600, bypassing the operations of [(1+D) mod 4] coding block 702, inverse Gray coding block 704, remove termination bits block 706, and remove overhead block 708.

Figure 6B:
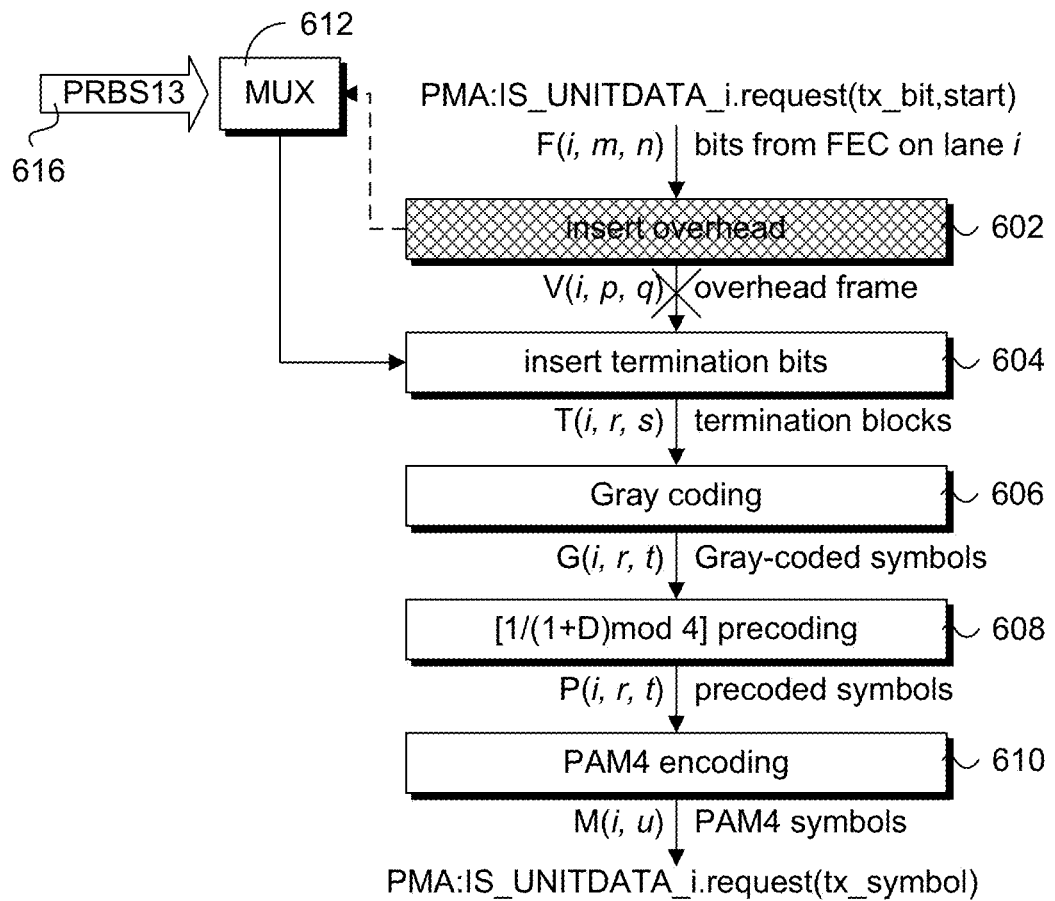
FIG. 6b is a transmit adaption process diagram illustrating operations performed by the PMA sublayer during transmission of the Training Pattern portion of an training frame; according to one embodiment.
Figure 7B:
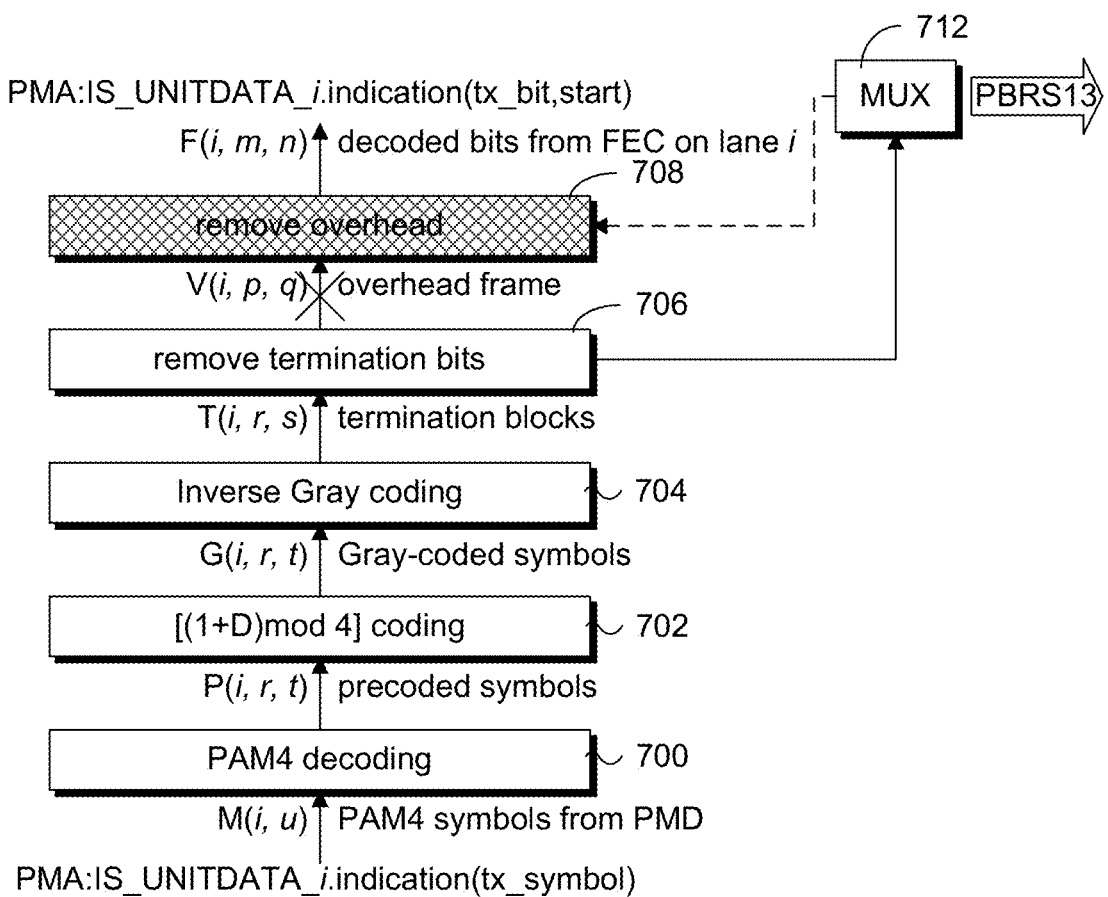
FIG. 7b is a receive adaption process diagram illustrating operations performed by the PMA sublayer during receiving of the Training Pattern portion of an training frame; according to one embodiment.

In one embodiment, Training Pattern 408 uses the PMA transmit and receive functional specifications as currently defined in IEEE P802.3bj Draft 2.1 to enable the transmitter and receiver to exercise termination block, gray coding, and 1/(1+D) mod 4 precoding stages, while the overhead framer is bypassed. Corresponding block diagrams to facilitate the transmitter and receiver operations are shown in FIGS. 6b and 7b, respectively. Training Pattern 408 employs all four levels of PAM4 signaling to facilitate receiver calibration.

In one embodiment, input data 616 to the termination block logic (i.e., insert termination bits block 604 in FIG. 6b) comprises a 13-bit Quaternary Pseudo Random Bit Sequence known as QPRBS13. The QPRBS13 is produced through use of a 8191 bit PRBS13 sequence derived from a Fibonacci LFSR (Linear Feedback Shift Register) with polynomial function, $$G(x)=1+x+x^2+x^{12}+x^{13}$$

Figure 4C:
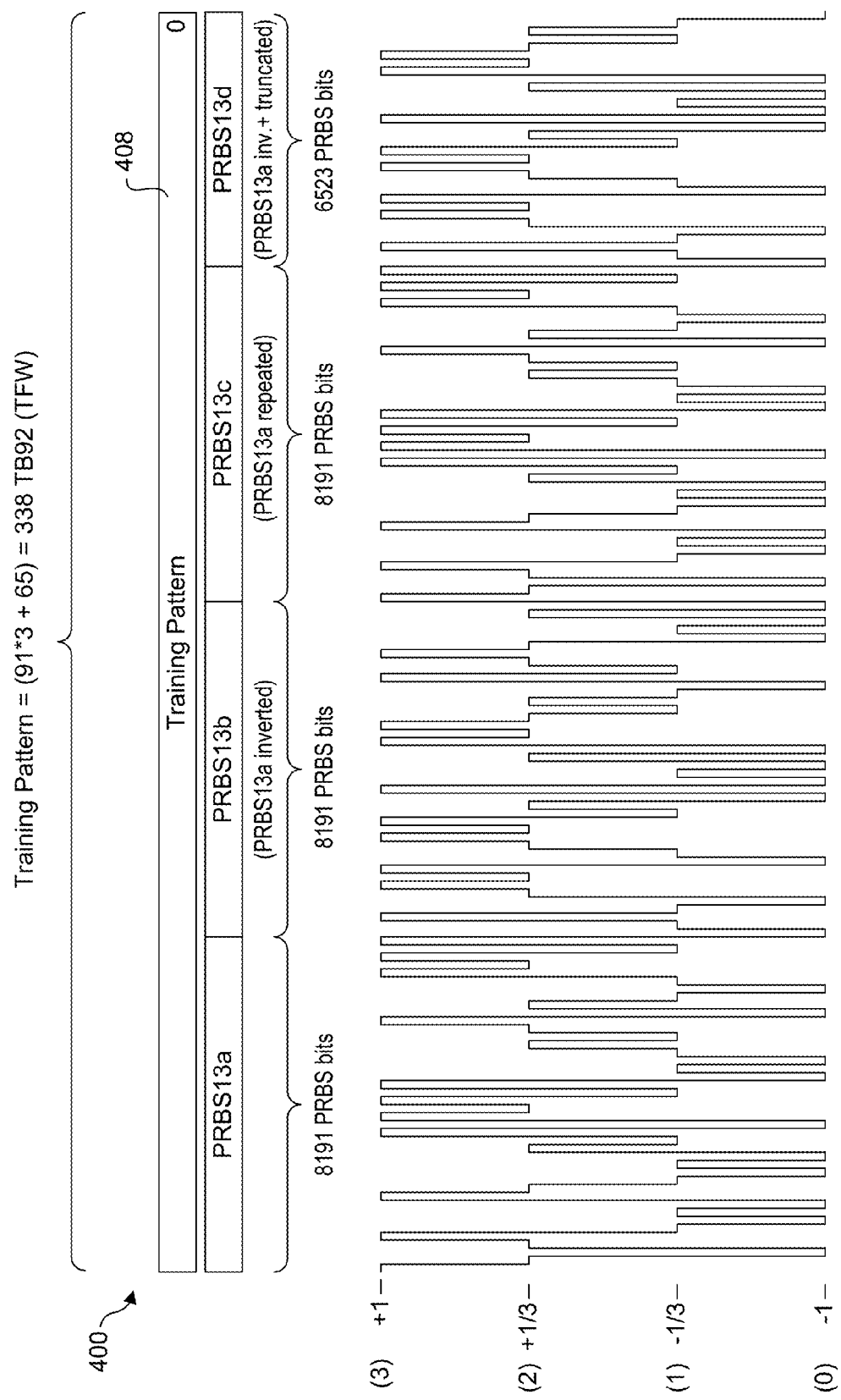
FIG. 4c is a schematic diagram illustrating further details of a training pattern used in the training frame of FIGS. 4b and 4c, according to one embodiment.

In one embodiment, each TFW termination block in the training pattern comprises 92 bits of PRBS13, with the first two bits comprising termination bits. In one embodiment training pattern 408 comprises three full sequences (i.e., 8191 bits) of PRBS13 data plus a truncated PRBS13 sequence of 6523 bits for a total of 31096 bits that are transmitted during the 338 TB92 blocks (338 TFWs) corresponding to Training Pattern 408, as shown in FIGS. 4b, 4c and 13. In one embodiment, the second PRBS13 sequence comprises a bit inversion of the first, as depicted by PRBS13a and PRBS13b in FIG. 4c, while the first and third PRBS13 sequences PRBS13a and PRBS13c are the same. In addition the truncated PRBS13 sequence is also an inverted portion of the first 6523 bits of PRBS13a.

Transition Time Measurement

In high-speed signaling communication standard, the transmitted data is converted by a physical medium-dependent (PMD) device to a physical voltage signal. Ideally, the voltage signal should have one of M several possible voltage levels (e.g. M=2 for the PAM2 signaling scheme, which maps "0" bits to one level and "1" bits to another level). The transitions between these levels should occur only at specific times (integer multiples of a UI) that correspond to a perfect clock. Accordingly, a clock with the same frequency is used in a receiver in order to sample the received signal and reconstruct the transmitted data.

In practice, the voltage levels generated by transmitters deviate from the desired levels, as do the timing of transitions between levels. The voltage deviations create noise that adds up to other noise sources and reduces the noise immunity of the receiver. The timing deviations may also be considered as additional noise, and might also cause the receiver clock to sample at incorrect times. Thus, communication standards that specify voltages and frequencies, typically limit the allowed deviations from the specified values.

Timing deviations observed on the transmitted signal are called "jitter". Jitter specifications are an important part of high-speed signaling standards. As the signaling speed increases, the UI gets shorter and jitter should decrease proportionally. The jitter specifications are thus typically stated as fractions of a UI.

Jitter is typically separated into low frequency and high frequency components. Low frequency jitter (sometimes called "drift or "wander") typically originates from PLL phase noise. It is assumed to be tracked by the receiver, and thus is of low interest. High frequency jitter is created either from PLL phase noise or from other causes; It is assumed to be impossible to track, and thus must be limited to prevent sampling errors in the receiver. It is sometimes further divided into components of deterministic jitter (DJ) and random jitter (RJ) to capture its statistical properties. Duty cycle distortion (DCD) is a special kind of DJ sometimes measured separately between even and odd bit width (a common phenomenon in some transmitters, which has a large effect on receiver performance). DCD is also called even-odd jitter (EOJ).

For a 100GBASE-KP4 link, transition time measurements are problematic, since the lossy printed circuit board can distort the test pattern and increase the measured "noise," although it is actually a linear effect that is mitigated by equalization.

Under a current IEEE proposal, it is assumed that a PAM4 transmitter is capable of producing a PAM2 waveform with only 2 logic levels. This requires special test modes or manipulation of internal logic paths. Moreover, there are other major problems with this approach. First, transition time measurement methods are specific to PAM2 modulation, and cannot be easily translated to higher-order PAM schemes, such as PAM4. Second, since both jitter and noise are transmitter effects that contribute to noise during a transition time measurement, it would be better to make the measurement after these artifacts have been removed. In addition, the proposed measurement scheme contains many steps, some of which require non-trivial calculations that are typically done by specialized test equipment.

In accordance with aspects of the embodiments now disclosed, transition time measurements of PAM4 transmitters are measured using specific portions of a quaternary PBRS13 training pattern over which the signal is similar to a PAM2 waveform. In particular, the signal transitions within sequences of at least three −1 PAM4 symbols followed by at least three +1 PAM4 symbols and at least three +1 PAM4 symbols followed by at least three −1 PAM4 symbols are measured.

Figures 8A, 8B:
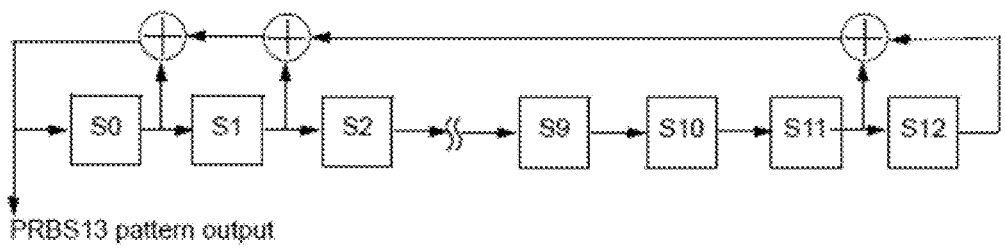
FIG. 8a is a block diagram of one embodiment of a PRBS13 pattern generator.
FIG. 8b shows seeds used for lanes 0-3, according to one embodiment.

Although a QPRBS13 pattern approaches a random pattern, there are sequences in the pattern that are not completely random. The pattern has various sequences if N−1 symbols followed by M+1 symbols, followed by O−1 symbols, etc. The specific QPRBS13 pattern for a given lane is dependent on the seed for the PRBS13 used for the lane. In one embodiment, the PRBS13 pattern is generated by a PBRS13 pattern generator shown in FIG. 8a using the polynomial $G(x)=1+x+x^2+x^{12}+x^{13}$. In one embodiment the seeds shown in FIG. 8b are used for Lanes 0-3.

FIG. 9 shows the number of occurrences of "run" patterns for a QPRBS13 patterns for Lane 0 using seed 0000010101011. The first and second columns represent the length of the run for the −1 and +1 symbols, wherein the first column represents a run length for a first symbol and the second column represents a run length for the other signal. The third column lists the number of occurrence for falls, under which the break in the run is from a +1 to a −1, while the fourth columns list the number of occurrences for rises, under which the break in the run is from a −1 to a +1. For example, in the QPRBS13 pattern for Lane 0 there are 943 instances of the sequence +1 PAM4 symbol followed by −1 PAM4 symbol and 907 instances of the sequence −1 PAM4 symbol followed by +1 PAM4 symbol, as depicted by the values in the first row of the table. As shown in the second row, there are 253 instances of the sequence of PAM4 symbols +1, −1, −1, and 236 instances of the sequence of PAM4 symbols −1, +1, +1.

It was initially desired to find sequences of at least 3 symbols of a first +1 PAM4 symbol or −1 PAM4 symbol value followed by at least 3 symbols of the other value. It was determined that the only run sequence meeting this requirement (for any lane) was 3-1 symbols followed by 3+1 symbols and 3-1 symbols followed by 3+1 symbols. As shown in the row values depicted in the box 800 of FIG. 1, for Lane 0 there are 3 occurrences of the rise sequence −1, −1, −1, +1, +1, +1 and 2 occurrences of the fall sequence +1, +1, +1, −1, −1, −1.

TABLES 1, 2, 3, and 4 below list the offset location of the occurrences for rise and fall sequences meeting the foregoing requirements for Lanes 0, 1, 2, and 3, respectively. The offset location is the bit sequence number in the QPRBS13 training pattern for each lane relative to the start of the training pattern using the seeds shown in FIG. 8b.

TABLE 1

| Lane 0 | Rise (−1 ... −1 -> +1 ... +1) | Fall (+1 ... +1 -> −1 ... −1) |
| --- | --- | --- |
| Offset | 5015 | 691 |
| Offset | 7828 | 8286 |
| Offset | | 14045 |

TABLE 2

| Lane 1 | Rise (−1 ... −1 -> +1 ... +1) | Fall (+1 ... +1 -> −1 ... −1) |
| --- | --- | --- |
| Offset | 2637 | 3648 |
| Offset | 4834 | 4426 |
| Offset | 10828 | 7116 |
| Offset | 12457 | |

TABLE 3

| Lane 2 | Rise (−1 ... −1 -> +1 ... +1) | Fall (+1 ... +1 -> −1 ... −1) |
| --- | --- | --- |
| Offset | 3464 | 7367 |
| Offset | 13852 | 7943 |
| Offset | | 13444 |

TABLE 4

| Lane 3 | Rise (−1 ... −1 -> +1 ... +1) | Fall (+1 ... +1 -> −1 ... −1) |
| --- | --- | --- |
| Offset | 2955 | 104 |
| Offset | 6542 | 6702 |
| Offset | 7110 | 7527 |
| Offset | 14209 | 8295 |

Aspects of the time transition measurement are performed in a somewhat similar manner to the method defined in clause 85 of IEEE 802.3, but with a PAM4 modulated signal instead of the original PAM2 defined for clause 85. Also, while the clause 85 method measures the linear characteristics of the transmitter by fitting a linear transfer function to the measurement of an waveform as a whole, the new method focuses on the portions of the waveform that correspond to the foregoing rise and fall sequences.

In one embodiment, the waveform is measured using a Preset equalizer setting, in which transmitter equalization is disabled. The transition times are measured from the 20% to the 80% point of the peak to peak voltage difference between a −1 PAM4 symbol and +1 PAM4 symbol in the portion of the waveform meeting the rise and fall sequence criteria.

Figure 10:
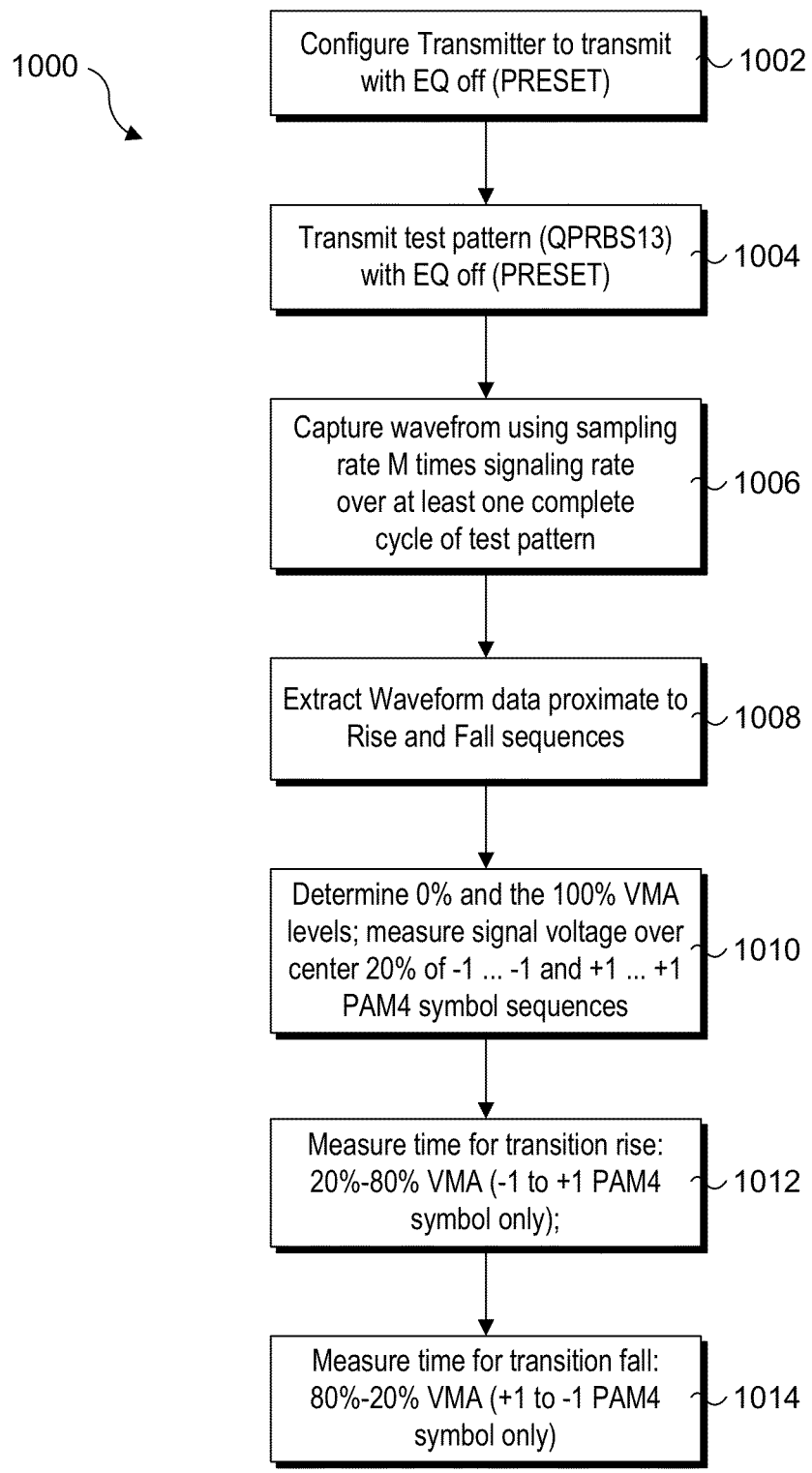
FIG. 10 is a flowchart illustrating operations performed during a transition time measurement test procedure, according to one embodiment.

With reference to the flowchart 1000 of FIG. 10, one embodiment for measuring transition times for a PAM4 transmitter signal proceeds as follows. First, in a block 1002, the transmitter is configured in a Preset equalizer configuration under which transmitter equalization (EQ) is turned off. The 100GBASE-KP4 transmit function includes programmable equalization to compensate for the frequency-dependent loss of the channel and facilitate data recovery at the receiver. The functional model for the transmit equalizer is the three tap transversal filter, as shown in FIG. 11. The state of the transmit equalizer and hence the transmitted output waveform may be manipulated via the PMD control function or via a management interface. In one embodiment, the transmit function responds to a set of commands issued by a link partner's receive function and is conveyed by a back-channel communications path. With further reference to FIG. 12, in one embodiment the taps c(−1), c(0), and c(1) may be configured by setting applicable values in the coefficient update fields of a training frame, as follows.

The preset control is sent to request that the coefficients be set to a state where equalization is turned off. When received, the pre-cursor (k=−1) (Coefficient (−1) update) and post-cursor (k=+1) (Coefficient (+1) update) coefficients are set to a zero value and the main (k=0) (Coefficient (0) update) coefficient is set to its maximum value. The preset control is initially sent when all coefficient status report fields (see FIG.

13) indicate not_updated [0 0], and will then continue to be sent until the status for all coefficients indicates updated or maximum. At that point, the outgoing preset control may be set to zero. With reference to the status report fields shown in FIG. 13, a maximum status value [1 1] is returned when the main coefficient is updated. Similarly a maximum status value will be returned for the pre-cursor and/or post-cursor coefficients when the coefficient is updated and zero is its maximum supported value. Alternatively, an updated status value [0 1] will be returned for the pre-cursor and/or post-cursor coefficients when the coefficient is updated and it supports additional settings above the value zero.

After the Preset transmitter configuration is set, a test pattern is repetitively transmitted from the transmitter, as shown in a block 1004. In one embodiment, the training pattern portion of training frame 400 of FIG. 4b is used for the test pattern. In one embodiment, the test pattern comprises a QPRBS13 pattern that is repetitively transmitted using the QPRBS13 generator of FIG. 8a and the PRBS13 seed value for the applicable lane being tested in FIG. 8b.

As the test pattern is transmitted, transmitted signal waveform data is captured in block 1006 using a sampling rate M times the signaling rate over one or more complete test pattern cycles. In one embodiment M≥7 or greater. The captured waveform represents an integer number of repetitions of the test pattern totaling N bits. Hence the length of the captured waveform should be MN samples. The waveform should be aligned such that the first M samples of the waveform correspond to the first bit of the test pattern, the second M samples to the second bit, and so on.

Next, as shown in a block 1008, waveform data proximate to the rise and fall sequences are captured. Symbol sequences proximate to rise and fall sequences at example offsets for lanes 0, 1, 2, and 3 are respectively shown in FIGS. 14a, 14b, 14c, and 14d.

Continuing at a block 1010, the next operation is to measure the voltage modulation amplitude (VMA) values for the +1 PMA signal level and the −1 PMA signal level. First the 0% and 100% VMA levels are determined. In one embodiment these are determined using a modified approach to that defined for an optical modulation amplitude (OMA) in IEEE 802.3 Clause 68.6.2. The 0% level and the 100% level are as defined by the OMA measurement procedure (Clause 52.9.5) with the exception that differential voltage is measured rather than optical power and the test pattern has a shorter run length. Under the modification, the −1 PMA signal level corresponds to a 0% OMA power level, and the +1 PMA signal level corresponds to a 100% OMA power level. As in Clause 68.6.2, the 0% and 100% VMA levels are determined by measuring the center 20% of the runs of the two symbol values proximate to the rise and fall symbol sequences. For example, examples for symbol runs of three +1 and three −1 symbols are this illustrated in FIGS. 15 and 16, as discussed below in further detail. If a rise or fall symbol sequence includes a run of symbols of greater than three, the center 20% of the run is also used. The −1 PMA VMA measurement over the center 20% is defined to be 0% VMA, while the +1 PMA VMA measurement over the center 20% is defined to be 100% VMA. Voltage levels for 20% VMA and 80% VMA are then determined relative to the 0% and 100% VMA voltage levels, as depicted in a block 1012 and further shown in FIGS. 15 and 16.

Figure 15:
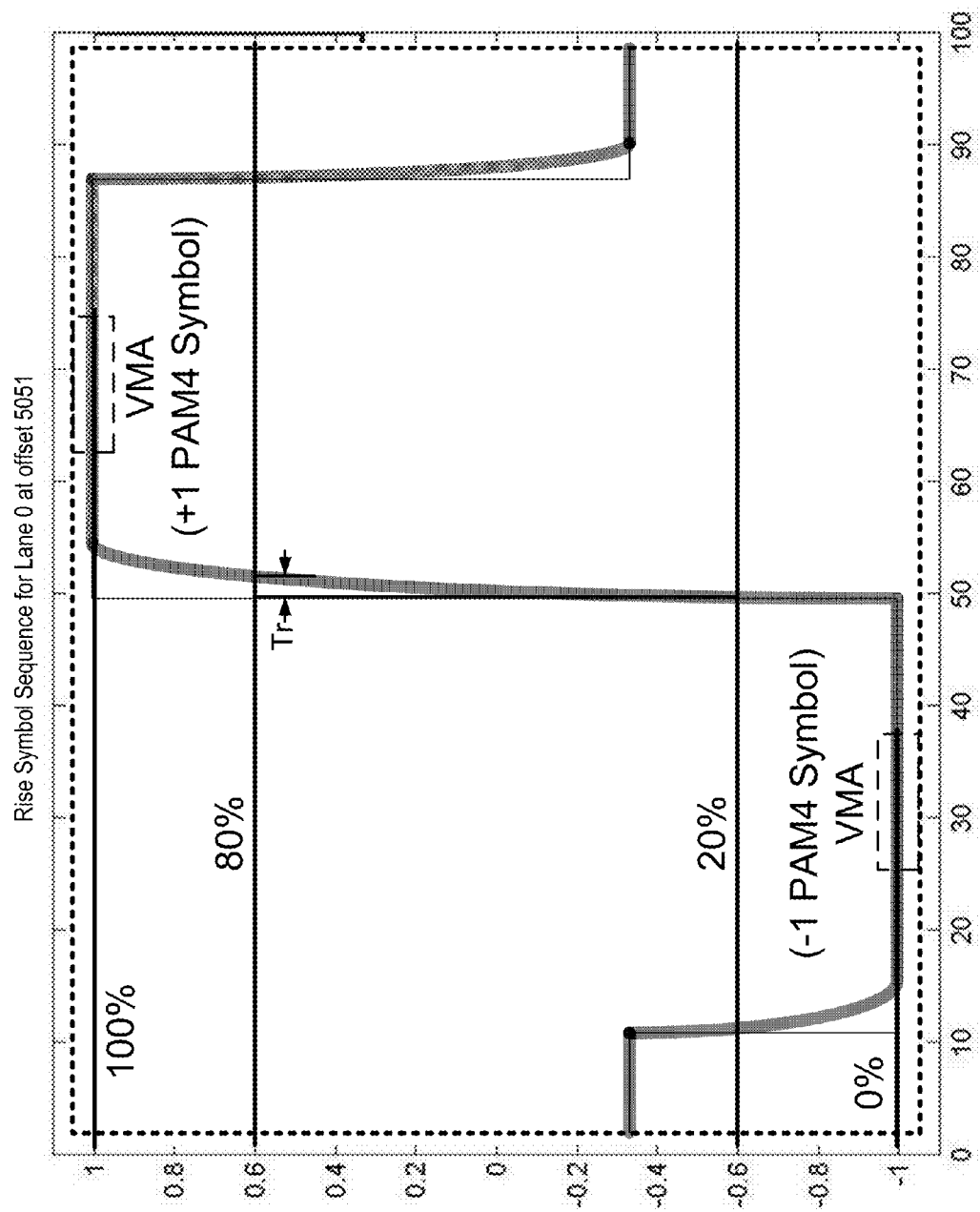
FIG. 15 shows an exemplary Tr measurement for the rise symbol sequence for lane 0 at offset 5051.
Figure 16:
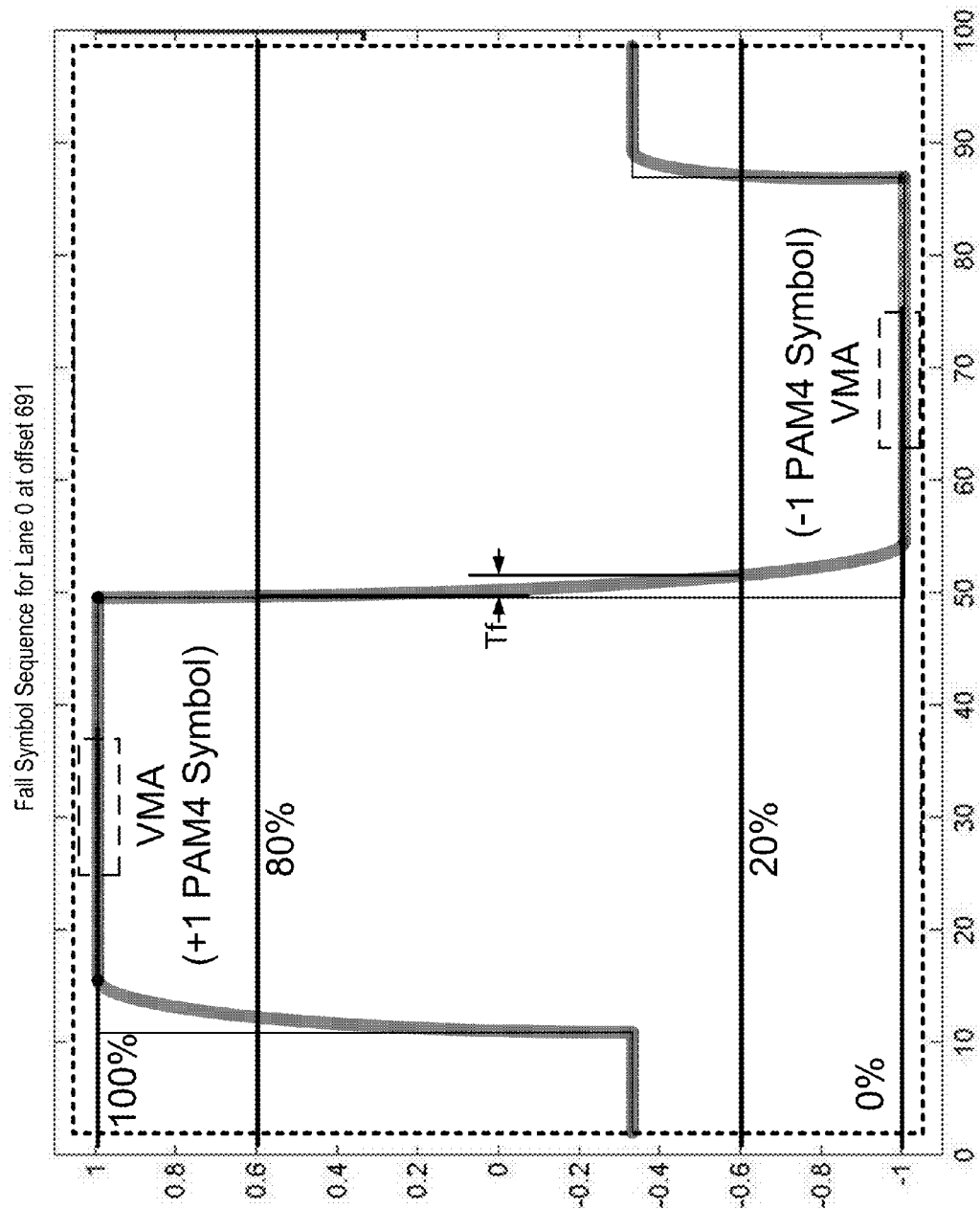
FIG. 16 shows an exemplary Tf measurement for the fall symbol sequence for lane 0 at offset 691.

At this point the transition rise and fall times are measured, as respectively depicted in blocks 1014 and 1016. The transition rise time Tr is determined by measuring the time between the 20% and 80% VMA voltage levels corresponding to a PAM4 signal transitioning from a −1 PMA signal level to a +1 PMA signal level, as shown in FIG. 15. A transition fall time Tf is determined in a similar manner by measuring the time between the 80% and 20% VMA voltage levels corresponding to a PAM4 signal transitioning from a +1 PMA signal level to a −1 PMA signal level, as shown in FIG. 16. The foregoing measurements may be performed using a graphical representation of the output signal (e.g., via waveform capture with a scope), or may be calculated using a numerical method of captured data.

The foregoing process is performed for each of the four transmitter lanes. In one embodiment, the transmitted test patterns employ initial states for the PRBS13, gray code, and precoder data sequences shown in FIG. 17. For each physical lane i=0 . . . 3, the training sequence shall start from state Si. This will also uniquely identify the lanes if they are swapped, and save lane order identification later on. In one embodiment individual measurements of individual rise and fall symbol sequences are measured for at least one rise and at least one fall symbol sequence for each lane. Alternatively, individual measurements for all rise and fall symbol sequences may be performed. Generally, the Tr and Tf measurements may be measured individually, may be averaged across multiple measurements for each lane, or may be averaged across multiple measurements for all lanes.

Figure 18A:
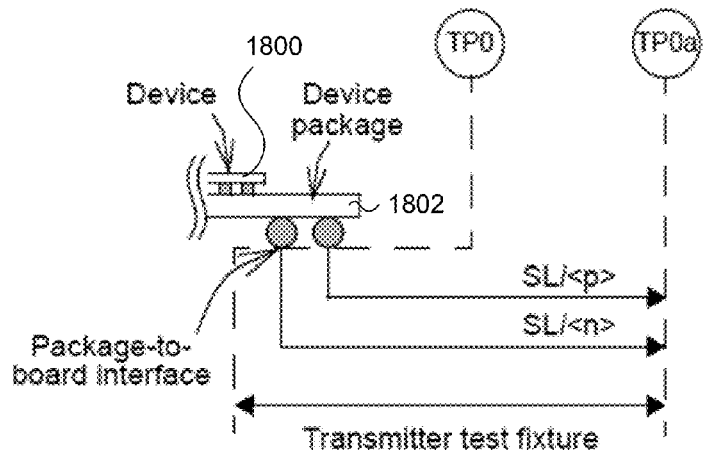
FIG. 18a is a schematic diagram of a transmitter test fixture, according to one embodiment.
Figure 18B:
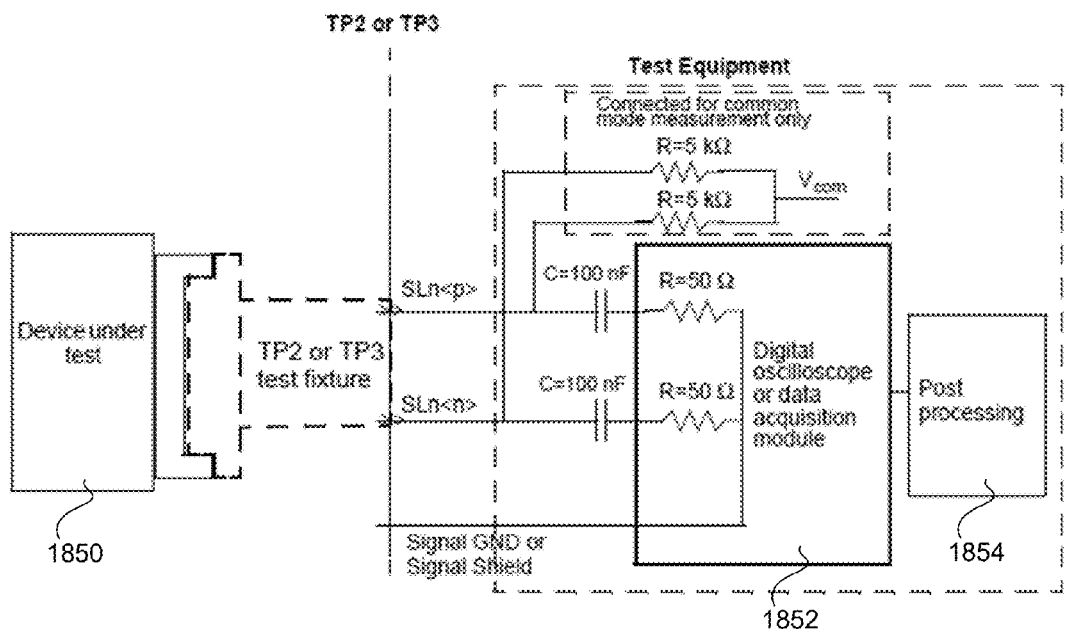
FIG. 18b is a schematic diagram of a transition time test measurement system, according to one embodiment.

FIGS. 18a and 18b respectively show a transmitter text fixture configuration and a transmitter transition test system configuration, according to one embodiment. In the illustrated embodiment, the device under test (DUT) may comprise a network interface chip, such as a Network Interface Controller (NIC) chip, or it may comprise an apparatus including a network interface or the like. As shown in FIG. 18a, a device 1800 is mounted to a device package 1802, which in turn in mounted to a printed circuit board (PCB) in which wiring paths are embedded for facilitating a 100GBASE-KP4 Ethernet backplane link. SLi<p>, and SLi<n> correspond to the signal paths for the plus and minus differential signals for a given lane Li.

Under the test system configuration of FIG. 18b, signals from the transmitter of a DUT 1850 are received and captured by a waveform capture apparatus 1852 comprising a digital oscilloscope or data acquisition module. A post processing module or apparatus 1854 is interfaced to waveform capture apparatus 1852, and is configured to perform the post-processing operations of blocks 1008, 1010, 1012, and 1014 of flowchart 1000. In one embodiment, facilities for implementing post processing operations are provided via waveform capture apparatus 1852, such that a single apparatus is used for capturing transmitter waveform signals and determining transition time rise and fall times. In one embodiment the single apparatus comprises a computer with a data acquisition board configured to perform waveform capture. In another embodiment, a programmable digital oscilloscope is used. In either case, the post processing operations of blocks 1008, 1010, 1012, and 1014 may be implemented via corresponding software instructions that are configured to be executed by a processor or embedded logic in either the computer or programmable digital oscilloscope, as applicable.

In one embodiment, the transition times Tr and Tf for a 100GBASE-KP4 meet qualification criteria if they are ≥18 psec (25% of ~73 psec UI) when transmit equalization is disabled, as determined by the foregoing transition time measurement technique. Accordingly, an apparatus including a network interface having a transmitter configured to implement a 100GBASE-KP4 link is qualified under the proposed 100GBASE-KP4 if the measured transition rise and fall times are ≥18 psec for each Tr and Tf measurement.

FIG. 19 shows an architecture 1900 for a network node employing an apparatus comprising a network chip 1902 including transmitter circuitry configured to transmit PAM4 signals meeting the rise and fall transition time requirements defined by 100GBASE-KP4, where the rise and fall transition times are measured in accordance with aspects of the embodiments disclosed herein. Network chip 1902 comprises PHY circuitry 1904 including a PCS module 1906, an auto-negotiation module 1908, a link training module 1910, a transmitter port 1912 including transmitter circuitry 1913 and a receiver port 1914 including receiver circuitry 1915. Network chip 1902 further includes a DMA (Direct Memory Access) interface 1916, a Peripheral Component Interconnect Express (PCIe) interface 1918, a MAC module 1920 and a Reconciliation Sublayer (RS) module 1922. Network node 1900 also comprises a System on a Chip (SoC) 1924 including a Central Processing Unit (CPU) 1926 having one or more processor cores, coupled to a memory interface 1928 and a PCIe interface 1930 via an interconnect 1932. Memory interface 1928 is further depicted as being coupled to memory 1934. Under a typical configuration, network chip 1902, SoC 1924 and memory 1934 will be mounted on or otherwise operatively coupled to a circuit board 1936 that includes wiring traces for coupling these components in communication, as depicted by single lines connecting DMA 1916 to memory 1934 and PCIe interface 1918 to PCIe interface 1930 at a PCIe port 1938.

In one embodiment, MAC module 1920 is configured to implement aspects of the MAC layer operations performed by embodiments described herein. Similar, RS module 1922 is configured to implement reconciliation sub-layer operations performed by embodiments described herein, such as illustrated in FIG. 5a.

Link training module 1910 is further depicted as including QPRBS13 test pattern generator 1940, which in one embodiment is configured to generate the QPRBS13 test pattern sequences using the seeds shown in FIG. 8b and the initial states shown in FIG. 17. Auto-negotiation module 1908 is further depicted as including a base page 1942. During link initialization prior to transmitter testing, auto-negotiation module 1908 is implemented for auto-negotiation of link speed and capabilities. The auto-negotiation format consists of a base-page (e.g., base page 1942), which is the first set of formatted information exchanged with the link partner, as depicted by a link partner 1944 including a receiver port 1946 and a transmitter port 1948. In one embodiment the configuration of node 1900 and link partner 1944 are similar. In one embodiment, the format of base page 1942 is in accordance with the base page format defined in IEEE 802.3-2012. Link training module 1910 is further configured to perform link training operations relating to initialization for a link 1950 communicatively coupled between network chip 1902 and link partner 1944 in accordance with aspects of the embodiments disclosed herein.

In one embodiment, network chip 1902 comprises a 100 Gbps Ethernet Network Interface Controller (NIC) chip. However, the circuitry and components of network chip 1902 may also be implemented in other types of chips and components, including SoCs, multi-chip modules, and NIC chips including support for multiple network interfaces (e.g., wired and wireless).

In addition, embodiments of the present description may be implemented not only within a semiconductor chip such as a NIC, but also within non-transient machine-readable media. For example, the designs described above may be stored upon and/or embedded within non-transient machine readable media associated with a design tool used for designing semiconductor devices. Examples include a netlist formatted in the VHSIC Hardware Description Language (VHDL) language, Verilog language or SPICE language, or other Hardware Description Language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

As discussed above, various aspects of the embodiments herein may be facilitated by execution of corresponding software instructions on a machine, such as a computer or module in a digital oscilloscope. Thus, embodiments of this invention may be used as or to support a software program, software modules, and/or firmware comprising instructions configured to be executed on a machine comprising some form of processing core (such as the CPU of a computer, one or more cores of a multi-core processor, etc.), or a virtual machine running on a processor or core or otherwise implemented or realized upon or within a machine-readable medium. A tangible, non-transitory machine-readable medium includes any mechanism for storing information in a form readable by a machine (e.g., a computer). For example, a machine-readable medium may include a read only memory (ROM), non-volatile memory (e.g., flash memory); a random access memory (RAM); a magnetic disk storage media; an optical storage media, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for measuring signal transition times for a four-level pulse modulated amplitude (PAM4) transmitter, comprising:
    transmitting a test pattern with the PAM4 transmitter, the test pattern having at least one rising signal sequence having a PAM4 symbol pattern of at least three −1 PAM4 symbols followed by at least three +1 PAM4 symbols and at least one falling signal sequence having a PAM4 symbol pattern of at least three +1 PAM4 symbols followed by at least three −1 PAM4 symbols;
    capturing a waveform of the test pattern, the captured waveform at least including portions of the test pattern proximate to at least one rising sequence and at least one falling signal sequence;
    determining, using the captured waveform, a voltage modulation amplitude (VMA) level for each of a −1 and +1 PAM4 symbol to determine a 0% and 100% VMA level;
    deriving a 20% VMA level and an 80% VMA level as a function of the VMA 0% and 100% VMA levels;
    determining a rise transition time by measuring a time interval between when a rising PAM4 signal from a −1 PAM4 symbol to a +1 PAM4 symbol for a rising signal sequence crosses the 20% VMA voltage level and crosses the 80% VMA voltage level; and
    determining a fall transition time by measuring a time interval between when a falling PAM4 signal from a +1 PAM4 symbol to a −1 PAM4 symbol for a falling signal sequence crosses the 80% VMA voltage level and crosses the 20% VMA voltage level,
    wherein determining the 0% VMA voltage level comprises measuring the transmitter signal voltage level over the center 20% of the portion of the waveform comprising at least three consecutive −1 PAM4 symbols, and wherein measuring the 100% VMA voltage level comprises measuring the transmitter signal voltage level over the center 20% of the portion of the waveform comprising at least three consecutive +1 PAM4 symbols immediately before or after that at least three consecutive −1 PAM4 symbols.

2. The method of claim 1, further comprising performing the method for each of a plurality of lanes in a multi-lane communication link.

3. The method of claim 2, wherein the multi-lane communications link comprises a 100 Gigabits per second Ethernet Link.

4. The method of claim 1, wherein the test pattern comprises a 13-bit Quardinary Pseudo Random Bit Sequence (QPRBS13).

5. The method of claim 4, further comprising:
    employing a Fibonacci LFSR (Linear Feedback Shift Register) with polynomial function, $$G(x)=1+x+x^2+x^{12}+x^{13}$$

using a seed 0000010101011 to generate a first 13-bit Pseudo Random Bit Sequence (PRBS13);
    applying a Gray code operation to the first PRBS13 to generate a Gray coded symbol sequence;
    applying a Precode operation on the Gray coded symbol sequence to generate a Precoded symbol sequence
    employing a PAM4 operation on the Precoded symbol sequence to generate a first QPRBS13 test pattern for a first lane 0;
    determining a rise transition time corresponding to a least one rise signal sequence in the first QPRBS13 test pattern that begins at an offset of 5015 or 7828 from the beginning of the first QPRBS13 test pattern; and
    determining a fall transition time corresponding to a least one fall signal sequence in the first QPRBS13 test pattern that begins at an offset of 691, 8286, or 14045 from the beginning of the first QPRBS13 test pattern.

6. The method of claim 4, further comprising:
    employing a Fibonacci LFSR (Linear Feedback Shift Register) with polynomial function, $$G(x)=1+x+x^2+x^{12}+x^{13}$$

using a seed 0011101000001 to generate a second 13-bit Pseudo Random Bit Sequence (PRBS13);
    applying a Gray code operation to the second PRBS13 to generate a Gray coded symbol sequence;
    applying a Precode operation on the Gray coded symbol sequence to generate a Precoded symbol sequence
    employing a PAM4 operation on the Precoded symbol sequence to generate a second QPRBS13 test pattern for a second lane 1;
    determining a rise transition time corresponding to a least one rise signal sequence in the second QPRBS13 test pattern that begins at an offset of 2637, 4834, 10828 or 12457 from the beginning of the second QPRBS13 test pattern; and
    determining a fall transition time corresponding to a least one fall signal sequence in the second QPRBS13 test pattern that begins at an offset of 3648, 4426, or 7116 from the beginning of the second QPRBS13 test pattern.

7. The method of claim 4, further comprising:
    employing a Fibonacci LFSR (Linear Feedback Shift Register) with polynomial function, $$G(x)=1+x+x^2+x^{12}+x^{13}$$

using a seed 1001000101100 to generate a third 13-bit Pseudo Random Bit Sequence (PRBS13);
    applying a Gray code operation to the third PRBS13 to generate a Gray coded symbol sequence;

applying a Precode operation on the Gray coded symbol sequence to generate a Precoded symbol sequence employing a PAM4 operation on the Precoded symbol sequence to generate a third QPRBS13 test pattern for a third lane 2;

determining a rise transition time corresponding to a least one rise signal sequence in the third QPRBS13 test pattern that begins at an offset of 3464 or 13852 from the beginning of the third QPRBS13 test pattern; and determining a fall transition time corresponding to a least one fall signal sequence in the third QPRBS13 test pattern that begins at an offset of 7367, 7943, or 13444 from the beginning of the third QPRBS13 test pattern.

8. The method of claim 4, further comprising:

employing a Fibonacci LFSR (Linear Feedback Shift Register) with polynomial function, $$G(x)=1+x+x^2+x^{12}+x^{13}$$

using a seed 0100010000010 to generate a fourth 13-bit Pseudo Random Bit Sequence (PRBS13);

applying a Gray code operation to the fourth PRBS13 to generate a Gray coded symbol sequence;

applying a Precode operation on the Gray coded symbol sequence to generate a Precoded symbol sequence employing a PAM4 operation on the Precoded symbol sequence to generate a fourth QPRBS13 test pattern for a fourth lane 3;

determining a rise transition time corresponding to a least one rise signal sequence in the fourth QPRBS13 test pattern that begins at an offset of 2955, 6542, 7110, or 14209 from the beginning of the fourth QPRBS13 test pattern; and determining a fall transition time corresponding to a least one fall signal sequence in the fourth QPRBS13 test pattern that begins at an offset of 104, 6702, 7527, or 8295 from the beginning of the fourth QPRBS13 test pattern.

9. The method of claim 1, further comprising:

storing the captured waveform as digitized waveform data;

averaging digitized waveform data for a plurality of rising signal sequences and a plurality of falling signal sequences; and employing averaged digitized waveform data to determine the rise transition time and the fall transition time.

10. The method of claim 1, wherein the transmitter is configurable to effect a plurality of transmitter equalization settings, and the test pattern is transmitted using a transmitter equalization setting under which equalization is turned off.

11. The method of claim 1, further comprising:

capturing the waveform of the test pattern with one of a digital oscilloscope of acquisition module and storing corresponding digital test data;

implementing post processing operations on the digital test data via execution of software instructions to determine the rise transition time and the fall transition time.

12. A test system for measuring rise and fall transition times for a four-level pulse modulated amplitude (PAM4) transmitter, comprising:

a device under test (DUT) fixture configured to interface with a DUT including a PAM4 transmitter, the PAM4 transmitter configured to transmit a test pattern having at least one rising signal sequence having a PAM4 symbol pattern of at least three −1 PAM4 symbols followed by at least three +1 PAM4 symbols and at least one falling signal sequence having a PAM4 symbol pattern of at least three +1 PAM4 symbols followed by at least three −1 PAM4 symbols;

a waveform capture apparatus, configured to digitally capture a waveform of the test pattern transmitted by the PAM4 transmitter of the DUT during a test procedure and store corresponding digitized waveform data; and a post processing apparatus configured to, detect instances of at least one rising signal sequence and at least one falling signal sequence;

determine a 0% and 100% voltage modulation amplitude (VMA) level for each of a −1 and +1 PAM4 symbol;

derive a 20% VMA level and an 80% VMA level as a function of the VMA 0% and 100% VMA levels;

determine a rise transition time by measuring a time interval between when a rising PAM4 signal from a −1 PAM4 symbol to a +1 PAM4 symbol for a rising signal sequence crosses the 20% VMA voltage level and crosses the 80% VMA voltage level; and determine a fall transition time by measuring a time interval between when a falling PAM4 signal from a +1 PAM4 symbol to a −1 PAM4 symbol for a falling signal sequence crosses the 80% VMA voltage level and crosses the 20% VMA voltage level, wherein the post processing apparatus configured to determine the 0% VMA voltage level by measuring the transmitter signal voltage level over the center 20% of the portion of the waveform comprising at least three consecutive −1 PAM4 symbols, and determine the 100% VMA voltage level by measuring the transmitter signal voltage level over the center 20% of the portion of the waveform comprising at least three consecutive +1 PAM4 symbols immediately before or after that at least three consecutive −1 PAM4 symbols.

13. The test system of claim 12, wherein the test pattern comprises a 13-bit Quardinary Pseudo Random Bit Sequence (QPRBS13).

14. The test system of claim 12, wherein the PAM4 transmitter is configured to transmit signals over a plurality of lanes, and the waveform capture apparatus is configured to digitally capture a respective waveform signal for each of the plurality of lanes and determine at least one rise transition time and at least one fall transition time for each of the plurality of lanes.

15. The test system of claim 12, wherein a first QPRBS13 test pattern is transmitted for a first lane 0, a second QPRBS13 test pattern is transmitted for a second lane 1, a third QPRBS13 test pattern is transmitted for a third lane 2, and a fourth QPRBS13 test pattern is transmitted for a fourth lane 3, and the post processing apparatus is configured to, determine a rise transition time corresponding to a least one rise signal sequence in the first QPRBS13 test pattern that begins at an offset of 5015 or 7828 from the beginning of the first QPRBS13 test pattern;

determine a fall transition time corresponding to a least one fall signal sequence in the first QPRBS13 test pattern that begins at an offset of 691, 8286, or 14045 from the beginning of the first QPRBS13 test pattern;

determine a rise transition time corresponding to a least one rise signal sequence in the second QPRBS13 test pattern that begins at an offset of 2637, 4834, 10828 or 12457 from the beginning of the second QPRBS13 test pattern;

determine a fall transition time corresponding to a least one fall signal sequence in the second QPRBS13 test pattern that begins at an offset of 3648, 4426, or 7116 from the beginning of the second QPRBS13 test pattern;

determine a rise transition time corresponding to a least one rise signal sequence in the third QPRBS13 test pattern that begins at an offset of 3464 or 13852 from the beginning of the third QPRBS13 test pattern;

determine a fall transition time corresponding to a least one fall signal sequence in the third QPRBS13 test pattern that begins at an offset of 7367, 7943, or 13444 from the beginning of the third QPRBS13 test pattern;

determine a rise transition time corresponding to a least one rise signal sequence in the fourth QPRBS13 test pattern that begins at an offset of 2955, 6542, 7110, or 14209 from the beginning of the fourth QPRBS13 test pattern; and determine a fall transition time corresponding to a least one fall signal sequence in the fourth QPRBS13 test pattern that begins at an offset of 104, 6702, 7527, or 8295 from the beginning of the fourth QPRBS13 test pattern.

16. The test system of claim 12, wherein the PAM4 transmitter of the DUT is configurable to effect a plurality of transmitter equalization settings, and the test system further includes a link partner that is enabled, during the testing procedure, to configured the PAM4 transmitter to operate in a transmission configuration under which transmission equalization is turned off.

17. The test system of claim 12, wherein the test system is configured to qualify the rise and fall transition times for a 100GBASE-KP4 transmitter.

18. A tangible non-transitory machine-readable medium having software instructions stored thereon, configured to be executed on a machine to measure rise and fall transition times for a four-level pulse modulated amplitude (PAM4) transmitter by performing operations comprising:

accessing digitized waveform data corresponding to a transmitted PAM4 test pattern signal waveform that has been digitally captured, wherein the transmitted PAM4 test pattern includes at least one rising signal sequence having a PAM4 symbol pattern of at least three −1 PAM4 symbols followed by at least three +1 PAM4 symbols and at least one falling signal sequence having a PAM4 symbol pattern of at least three +1 PAM4 symbols followed by at least three −1 PAM4 symbols;

detecting instances of at least one rising signal sequence and at least one falling signal sequence;

determining a 0% and 100% voltage modulation amplitude (VMA) level for each of a −1 and +1 PAM4 symbol;

deriving a 20% VMA level and an 80% VMA level as a function of the VMA 0% and 100% VMA levels;

determining a rise transition time by measuring a time interval between when a rising PAM4 signal from a −1 PAM4 symbol to a +1 PAM4 symbol for a rising signal sequence crosses the 20% VMA voltage level and crosses the 80% VMA voltage level; and determining a fall transition time by measuring a time interval between when a falling PAM4 signal from a +1 PAM4 symbol to a −1 PAM4 symbol for a falling signal sequence crosses the 80% VMA voltage level and crosses the 20% VMA voltage level, wherein the software is configured to determine the 0% VMA voltage level by measuring the transmitter signal voltage level over the center 20% of the portion of the waveform comprising at least three consecutive −1 PAM4 symbols, and determine the 100% VMA voltage level by measuring the transmitter signal voltage level over the center 20% of the portion of the waveform comprising at least three consecutive +1 PAM4 symbols immediately before or after that at least three consecutive −1 PAM4 symbols.

19. The tangible non-transitory machine-readable medium of claim 18, wherein the test pattern comprises a 13-bit Quardinary Pseudo Random Bit Sequence (QPRBS13).

20. The tangible non-transitory machine-readable medium of claim 18, wherein the PAM4 transmitter is configured to transmit a respective test pattern over each of a plurality of lanes, and the software is configured to determine at least one rise transition time and at least one fall transition time for each of the plurality of lanes.

21. The tangible non-transitory machine-readable medium of claim 20, wherein the captured waveform data that is accessed includes waveform data for each of a first QPRBS13 test pattern is transmitted for a first lane 0, a second QPRBS13 test pattern is transmitted for a second lane 1, a third QPRBS13 test pattern is transmitted for a third lane 2, and a fourth QPRBS13 test pattern is transmitted for a fourth lane 3, and the software is configured to, determine a rise transition time corresponding to a least one rise signal sequence in the first QPRBS13 test pattern that begins at an offset of 5018 or 7828 from the beginning of the first QPRBS13 test pattern;

determine a fall transition time corresponding to a least one fall signal sequence in the first QPRBS13 test pattern that begins at an offset of 691, 8286, or 14045 from the beginning of the first QPRBS13 test pattern;

determine a rise transition time corresponding to a least one rise signal sequence in the second QPRBS13 test pattern that begins at an offset of 2637, 4834, 10828 or 12457 from the beginning of the second QPRBS13 test pattern;

determine a fall transition time corresponding to a least one fall signal sequence in the second QPRBS13 test pattern that begins at an offset of 3648, 4426, or 7116 from the beginning of the second QPRBS13 test pattern;

determine a rise transition time corresponding to a least one rise signal sequence in the third QPRBS13 test pattern that begins at an offset of 3464 or 13852 from the beginning of the third QPRBS13 test pattern;

determine a fall transition time corresponding to a least one fall signal sequence in the third QPRBS13 test pattern that begins at an offset of 7367, 7943, or 13444 from the beginning of the third QPRBS13 test pattern;

determine a rise transition time corresponding to a least one rise signal sequence in the fourth QPRBS13 test pattern that begins at an offset of 2955, 6542, 7110, or 14209 from the beginning of the fourth QPRBS13 test pattern; and determine a fall transition time corresponding to a least one fall signal sequence in the fourth QPRBS13 test pattern that begins at an offset of 104, 6702, 7527, or 8295 from the beginning of the fourth QPRBS13 test pattern.

22. The tangible non-transitory machine-readable medium of claim 18, wherein the software is configured, via execution on a machine, to qualify the rise and fall transition times for a 100GBASE-KP4 transmitter.

23. An apparatus, comprising:
Physical Layer (PHY) circuitry, including,
a Physical Coding Sublayer (PCS) module;
an auto-negotiation module;
a link training module;
a transmitter port including transmitter circuitry; and
a receiver port including receiver circuitry;
a Media Access Control (MAC) module;
a Reconciliation Sublayer (RS) module; and
a Peripheral Component Interconnect Express (PCIe) interface;

wherein the transmitter port is configured to transmit a plurality of four-level pulse modulated amplitude (PAM4) signals via four lanes, and wherein a design of the apparatus has been qualified to confirm the transmitted PAM4 signals meet rise and fall transition times for a 100GBASE-KP4 transmitter by performing operations comprising:

for each of the four lanes,
repetitively transmitting a test pattern with the PAM4 transmitter including at least one rising signal sequence having a PAM4 symbol pattern of at least three −1 PAM4 symbols followed by at least three +1 PAM4 symbols and at least one falling signal sequence having a PAM4 symbol pattern of at least three +1 PAM4 symbols followed by at least three −1 PAM4 symbols;
capturing a waveform of the test pattern to produce digitized waveform data;
determining, using the digitized waveform data, a voltage modulation amplitude (VMA) level for each of a −1 and +1 PAM4 symbol to determine a 0% and 100% VMA level;
deriving a 20% VMA level and an 80% VMA level as a function of the VMA 0% and 100% VMA levels;
determining a rise transition time by measuring a time interval between when a rising PAM4 signal from a −1 PAM4 symbol to a +1 PAM4 symbol for a rising signal sequence crosses the 20% VMA voltage level and crosses the 80% VMA voltage level; and
determining a fall transition time by measuring a time interval between when a falling PAM4 signal from a +1 PAM4 symbol to a −1 PAM4 symbol for a falling signal sequence crosses the 80% VMA voltage level and crosses the 20% VMA voltage level,
wherein the software is configured to determine the 0% VMA voltage level by measuring the transmitter signal voltage level over the center 20% of the portion of the waveform comprising at least three consecutive −1 PAM4 symbols, and determine the 100% VMA voltage level by measuring the transmitter signal voltage level over the center 20% of the portion of the waveform comprising at least three consecutive +1 PAM4 symbols immediately before or after that at least three consecutive −1 PAM4 symbols.

24. The apparatus of claim 23, wherein the test pattern comprises a 13-bit Quardinary Pseudo Random Bit Sequence (QPRBS13), and wherein a different initial state of the QPRBS13 test pattern is used for each of the four lanes.

25. The apparatus of claim 24, wherein a first QPRBS13 test pattern is transmitted for a first lane 0, a second QPRBS13 test pattern is transmitted for a second lane 1, a third QPRBS13 test pattern is transmitted for a third lane 2, and a fourth QPRBS13 test pattern is transmitted for a fourth lane 3, and wherein a design of the apparatus has been qualified to confirm the transmitted PAM4 signals meet rise and fall transition times for a 100GBASE-KP4 transmitter by performing operations comprising:

determining a rise transition time corresponding to a least one rise signal sequence in the first QPRBS13 test pattern that begins at an offset of 5018 or 7828 from the beginning of the first QPRBS13 test pattern;
determining a fall transition time corresponding to a least one fall signal sequence in the first QPRBS13 test pattern that begins at an offset of 691, 8286, or 14045 from the beginning of the first QPRBS13 test pattern;
determining a rise transition time corresponding to a least one rise signal sequence in the second QPRBS13 test pattern that begins at an offset of 2637, 4834, 10828 or 12457 from the beginning of the second QPRBS13 test pattern;
determining a fall transition time corresponding to a least one fall signal sequence in the second QPRBS13 test pattern that begins at an offset of 3648, 4426, or 7116 from the beginning of the second QPRBS13 test pattern;
determining a rise transition time corresponding to a least one rise signal sequence in the third QPRBS13 test pattern that begins at an offset of 3464 or 13852 from the beginning of the third QPRBS13 test pattern;
determining a fall transition time corresponding to a least one fall signal sequence in the third QPRBS13 test pattern that begins at an offset of 7367, 7943, or 13444 from the beginning of the third QPRBS13 test pattern;
determining a rise transition time corresponding to a least one rise signal sequence in the fourth QPRBS13 test pattern that begins at an offset of 2955, 6542, 7110, or 14209 from the beginning of the fourth QPRBS13 test pattern; and
determining a fall transition time corresponding to a least one fall signal sequence in the fourth QPRBS13 test pattern that begins at an offset of 104, 6702, 7527, or 8295 from the beginning of the fourth QPRBS13 test pattern.

26. The apparatus of claim 23, wherein the design of the apparatus has been qualified to confirm the transmitted PAM4 signals meet rise and fall transition times for a 100GBASE-KP4 transmitter by confirming each rise and fall transition time is >18 picoseconds.

27. The apparatus of claim 23, wherein the transmitter circuitry is configurable to effect a plurality of transmitter equalization settings, and the test pattern is transmitted using a transmitter equalization setting under which equalization is turned off.

* * * * *